(12) United States Patent
Hamano et al.

(10) Patent No.: US 8,856,844 B2
(45) Date of Patent: Oct. 7, 2014

(54) SYSTEMS AND METHODS FOR AUTOMATICALLY PURCHASING AND RECORDING POPULAR PAY PROGRAMS IN AN INTERACTIVE MEDIA DELIVERY SYSTEM

(75) Inventors: Royce Matsusei Hamano, Los Angeles, CA (US); Gevorg Gevorgyan, Glendale, CA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 12/889,892

(22) Filed: Sep. 24, 2010

(65) Prior Publication Data

US 2011/0161996 A1     Jun. 30, 2011

Related U.S. Application Data

(63) Continuation of application No. 11/985,847, filed on Nov. 16, 2007, now abandoned.

(51) Int. Cl.
*H04N 7/173* (2011.01)
*H04N 21/45* (2011.01)
*H04N 21/433* (2011.01)
*H04N 21/482* (2011.01)
*H04N 7/16* (2011.01)
*H04N 21/466* (2011.01)
*H04N 21/472* (2011.01)
*H04N 5/76* (2006.01)
*H04N 21/61* (2011.01)
*H04N 5/765* (2006.01)
*H04N 5/775* (2006.01)
*H04H 60/27* (2008.01)

(52) U.S. Cl.
CPC ............... *H04N 7/163* (2013.01); *H04N 5/765* (2013.01); *H04N 21/4532* (2013.01); *H04N 21/4334* (2013.01); *H04N 21/4826* (2013.01); *H04N 21/4661* (2013.01); *H04N 21/47214* (2013.01); *H04N 60/65* (2013.01); *H04N 5/775* (2013.01); *H04N 5/76* (2013.01); *H04N 21/6181* (2013.01); *H04N 21/47211* (2013.01); *H04H 60/27* (2013.01)
USPC ................ 725/87; 725/86; 725/100; 386/296

(58) Field of Classification Search
USPC ........................ 725/86, 87; 386/296
See application file for complete search history.

(56) References Cited

U.S. PATENT DOCUMENTS 4,081,753 A    3/1978   Miller
4,170,782 A    10/1979   Miller (Continued)

FOREIGN PATENT DOCUMENTS

DE    36 40 436    6/1988
DE    42 01 031    7/1993

(Continued)

OTHER PUBLICATIONS

ACM Multimedia 93 Proceedings, "A Digital On-Demand Video Service Supporting Content-Based Queries," Little et al. pp. 427-436, Jul. 1993.

(Continued)

*Primary Examiner* — Robert Hance
(74) *Attorney, Agent, or Firm* — Ropes & Gray LLP

(57) ABSTRACT

A system and method for automatically purchasing and recording popular pay program is disclosed. The pay programs are selected based on defined criteria and popularity. The most popular pay program that meets defined criteria will be automatically recorded and purchased. Notifications and confirmations are provided before purchase of pay programs.

31 Claims, 21 Drawing Sheets

(56) References Cited

U.S. PATENT DOCUMENTS

| | | | |
|---|---|---|---|
| 4,271,532 A | 6/1981 | Wine | |
| 4,367,559 A | 1/1983 | Tults | |
| 4,375,651 A | 3/1983 | Templin et al. | |
| 4,381,522 A | 4/1983 | Lambert | |
| 4,390,901 A | 6/1983 | Keiser | |
| 4,425,579 A | 1/1984 | Merrell | |
| 4,429,385 A | 1/1984 | Cichelli et al. | |
| 4,495,654 A | 1/1985 | Deiss | |
| 4,527,194 A | 7/1985 | Sirazi | |
| 4,641,205 A | 2/1987 | Beyers, Jr. | |
| 4,689,022 A | 8/1987 | Peers et al. | |
| 4,691,351 A | 9/1987 | Hayashi et al. | |
| 4,694,490 A | 9/1987 | Harvey et al. | |
| 4,706,121 A | 11/1987 | Young | |
| 4,751,578 A | 6/1988 | Reiter et al. | |
| 4,754,326 A | 6/1988 | Kram et al. | |
| 4,787,063 A | 11/1988 | Muguet | |
| 4,882,732 A | 11/1989 | Kaminaga | |
| 4,905,094 A | 2/1990 | Pocock | |
| 4,908,713 A | 3/1990 | Levine | |
| 4,937,863 A | 6/1990 | Robert et al. | |
| 4,959,719 A | 9/1990 | Strubbe et al. | |
| 4,963,994 A | 10/1990 | Levine | |
| 4,965,825 A | 10/1990 | Harvey et al. | |
| 4,977,455 A | 12/1990 | Young | |
| 4,991,011 A | 2/1991 | Johnson et al. | |
| 4,992,940 A | 2/1991 | Dworkin | |
| 5,036,314 A | 7/1991 | Barillari et al. | |
| 5,038,211 A | 8/1991 | Hallenbeck | |
| 5,047,867 A | 9/1991 | Strubbe et al. | |
| 5,075,771 A | 12/1991 | Hashimoto | |
| 5,077,607 A | 12/1991 | Johnson et al. | |
| 5,126,851 A | 6/1992 | Yoshimura et al. | |
| 5,155,591 A | 10/1992 | Wachob | |
| 5,170,388 A | 12/1992 | Endoh | |
| 5,172,413 A | 12/1992 | Bradley et al. | |
| 5,179,439 A | 1/1993 | Hashimoto | |
| 5,189,630 A | 2/1993 | Barstow et al. | |
| 5,204,897 A | 4/1993 | Wyman | |
| 5,208,665 A | 5/1993 | McCalley et al. | |
| 5,210,611 A | 5/1993 | Yee et al. | |
| 5,223,924 A | 6/1993 | Strubbe | |
| 5,231,494 A | 7/1993 | Wachob | |
| 5,233,423 A | 8/1993 | Jernigan et al. | |
| 5,237,157 A | 8/1993 | Kaplan | |
| 5,260,999 A | 11/1993 | Wyman | |
| 5,317,403 A | 5/1994 | Keenan | |
| 5,323,234 A | 6/1994 | Kawasaki | |
| 5,323,240 A | 6/1994 | Amano et al. | |
| 5,325,423 A | 6/1994 | Lewis | |
| 5,335,277 A | 8/1994 | Harvey et al. | |
| 5,343,239 A | 8/1994 | Lappington et al. | |
| 5,347,167 A | 9/1994 | Singh | |
| 5,347,632 A | 9/1994 | Filepp et al. | |
| 5,353,121 A | 10/1994 | Young et al. | |
| 5,357,276 A | 10/1994 | Banker et al. | |
| 5,359,367 A | 10/1994 | Stockill | |
| 5,396,546 A | 3/1995 | Remillard | |
| 5,404,393 A | 4/1995 | Remillard | |
| 5,410,326 A | 4/1995 | Goldstein | |
| 5,410,344 A | 4/1995 | Graves et al. | |
| 5,410,367 A | 4/1995 | Zahavi et al. | |
| 5,412,720 A | 5/1995 | Hoarty | |
| 5,416,508 A | 5/1995 | Sakuma et al. | |
| 5,432,561 A | 7/1995 | Strubbe | |
| 5,444,499 A | 8/1995 | Saitoh | |
| 5,446,919 A | 8/1995 | Wilkins | |
| 5,465,113 A | 11/1995 | Gilboy | |
| 5,465,385 A | 11/1995 | Ohga et al. | |
| 5,469,206 A | 11/1995 | Strubbe et al. | |
| 5,477,262 A | 12/1995 | Banker et al. | |
| 5,479,266 A | 12/1995 | Young et al. | |
| 5,481,296 A | 1/1996 | Cragun et al. | |
| 5,483,278 A | 1/1996 | Strubbe et al. | |
| 5,497,185 A | 3/1996 | Dufresne et al. | |
| 5,502,504 A | 3/1996 | Marshall et al. | |
| 5,504,519 A | 4/1996 | Remillard | |
| 5,523,794 A | 6/1996 | Mankovitz et al. | |
| 5,523,796 A | 6/1996 | Marshall et al. | |
| 5,524,195 A | 6/1996 | Clanton, III et al. | |
| 5,526,034 A | 6/1996 | Hoarty et al. | |
| 5,528,304 A | 6/1996 | Cherrick et al. | |
| 5,534,911 A * | 7/1996 | Levitan | 725/46 |
| 5,539,822 A | 7/1996 | Lett | |
| 5,550,576 A | 8/1996 | Klosterman | |
| 5,559,548 A | 9/1996 | Davis et al. | |
| 5,559,549 A | 9/1996 | Hendricks et al. | |
| 5,559,550 A | 9/1996 | Mankovitz | |
| 5,561,708 A | 10/1996 | Remillard | |
| 5,570,295 A | 10/1996 | Isenberg et al. | |
| 5,572,442 A | 11/1996 | Schulhof et al. | |
| 5,576,755 A | 11/1996 | Davis et al. | |
| 5,581,479 A | 12/1996 | McLaughlin et al. | |
| 5,583,560 A | 12/1996 | Florin et al. | |
| 5,585,838 A | 12/1996 | Lawler et al. | |
| 5,585,865 A | 12/1996 | Amano et al. | |
| 5,585,866 A | 12/1996 | Miller et al. | |
| 5,589,892 A | 12/1996 | Knee et al. | |
| 5,592,551 A | 1/1997 | Lett et al. | |
| 5,594,490 A | 1/1997 | Dawson et al. | |
| 5,594,509 A * | 1/1997 | Florin et al. | 725/43 |
| 5,596,373 A | 1/1997 | White et al. | |
| 5,600,364 A | 2/1997 | Hendricks et al. | |
| 5,606,374 A | 2/1997 | Bertram | |
| 5,617,565 A | 4/1997 | Augenbraun et al. | |
| 5,619,249 A | 4/1997 | Billock et al. | |
| 5,619,274 A | 4/1997 | Roop et al. | |
| 5,621,456 A | 4/1997 | Florin et al. | |
| 5,623,613 A | 4/1997 | Rowe et al. | |
| 5,627,940 A | 5/1997 | Rohra et al. | |
| 5,629,733 A | 5/1997 | Youman et al. | |
| 5,630,119 A | 5/1997 | Aristides et al. | |
| 5,635,978 A | 6/1997 | Alten et al. | |
| 5,635,979 A | 6/1997 | Kostreski et al. | |
| 5,635,989 A | 6/1997 | Rothmuller | |
| 5,640,501 A | 6/1997 | Turpin | |
| 5,640,577 A | 6/1997 | Scharmer | |
| 5,654,748 A | 8/1997 | Matthews, III | |
| 5,657,072 A | 8/1997 | Aristedes et al. | |
| 5,659,350 A | 8/1997 | Hendricks et al. | |
| 5,661,517 A | 8/1997 | Budow et al. | |
| 5,663,757 A | 9/1997 | Morales | |
| 5,664,111 A | 9/1997 | Nahan et al. | |
| 5,666,293 A | 9/1997 | Metz et al. | |
| 5,666,645 A | 9/1997 | Thomas et al. | |
| 5,671,411 A | 9/1997 | Watts et al. | |
| 5,675,390 A | 10/1997 | Schindler et al. | |
| 5,677,708 A | 10/1997 | Matthews, III et al. | |
| 5,682,206 A | 10/1997 | Wehmeyer et al. | |
| 5,686,954 A | 11/1997 | Yoshinobu et al. | |
| 5,692,214 A | 11/1997 | Levine | |
| 5,694,163 A | 12/1997 | Harrison | |
| 5,694,176 A | 12/1997 | Bruette et al. | |
| 5,696,905 A | 12/1997 | Reimer et al. | |
| 5,699,107 A | 12/1997 | Lawler et al. | |
| 5,710,601 A | 1/1998 | Marshall et al. | |
| 5,710,884 A | 1/1998 | Dedrick | |
| 5,715,314 A | 2/1998 | Payne et al. | |
| 5,715,399 A | 2/1998 | Bezos | |
| 5,717,923 A | 2/1998 | Dedrick | |
| 5,722,041 A | 2/1998 | Freadman | |
| 5,724,521 A | 3/1998 | Dedrick | |
| 5,724,567 A | 3/1998 | Rose et al. | |
| 5,727,163 A | 3/1998 | Bezos | |
| 5,731,844 A | 3/1998 | Rauch et al. | |
| 5,734,853 A | 3/1998 | Hendricks et al. | |
| 5,734,893 A | 3/1998 | Li et al. | |
| 5,751,282 A | 5/1998 | Girard et al. | |
| 5,752,160 A | 5/1998 | Dunn | |
| 5,754,939 A | 5/1998 | Herz et al. | |
| 5,758,257 A | 5/1998 | Herz et al. | |
| 5,758,259 A | 5/1998 | Lawler | |
| 5,759,101 A | 6/1998 | Von Kohorn | |
| 5,760,821 A | 6/1998 | Ellis et al. | |

(56) References Cited

U.S. PATENT DOCUMENTS

| | | | |
|---|---|---|---|
| 5,761,372 A | 6/1998 | Yoshinobu et al. | |
| 5,774,357 A | 6/1998 | Hofferg et al. | |
| 5,778,181 A | 7/1998 | Hidary et al. | |
| 5,781,246 A | 7/1998 | Alten et al. | |
| 5,790,202 A | 8/1998 | Kummer et al. | |
| 5,793,964 A | 8/1998 | Rogers et al. | |
| 5,798,785 A | 8/1998 | Hendricks et al. | |
| 5,801,747 A | 9/1998 | Bedard | |
| 5,812,205 A | 9/1998 | Milnes et al. | |
| 5,818,441 A | 10/1998 | Throckmorton et al. | |
| 5,819,034 A | 10/1998 | Joseph et al. | |
| 5,822,123 A | 10/1998 | Davis et al. | |
| 5,828,420 A | 10/1998 | Marshall et al. | |
| 5,844,620 A | 12/1998 | Coleman et al. | |
| 5,848,396 A | 12/1998 | Gerace | |
| 5,850,218 A | 12/1998 | LaJoie et al. | |
| 5,861,906 A | 1/1999 | Dunn et al. | |
| 5,862,292 A | 1/1999 | Kubota et al. | |
| 5,867,226 A | 2/1999 | Wehmeyer et al. | |
| 5,875,108 A | 2/1999 | Hoffberg et al. | |
| 5,880,768 A | 3/1999 | Lemmons et al. | |
| 5,889,950 A | 3/1999 | Kuzma | |
| 5,903,545 A | 5/1999 | Sabourin et al. | |
| 5,907,323 A | 5/1999 | Lawler et al. | |
| 5,914,746 A | 6/1999 | Matthews, III et al. | |
| 5,940,073 A | 8/1999 | Klosterman et al. | |
| 5,960,411 A | 9/1999 | Hartman et al. | |
| 5,973,683 A | 10/1999 | Cragun et al. | |
| 5,977,964 A | 11/1999 | Williams et al. | |
| 5,988,078 A | 11/1999 | Levine | |
| 5,990,927 A | 11/1999 | Hendricks et al. | |
| 6,002,394 A | 12/1999 | Schein et al. | |
| 6,005,565 A | 12/1999 | Legall et al. | |
| 6,005,597 A | 12/1999 | Barrett et al. | |
| 6,006,257 A | 12/1999 | Slezak | |
| 6,008,802 A | 12/1999 | Iki et al. | |
| 6,016,141 A | 1/2000 | Knudson et al. | |
| 6,020,883 A | 2/2000 | Herz et al. | |
| 6,025,837 A | 2/2000 | Matthews, III et al. | |
| 6,029,195 A | 2/2000 | Herz | |
| 6,072,460 A | 6/2000 | Marshall et al. | |
| 6,075,526 A | 6/2000 | Rothmuller | |
| 6,081,750 A | 6/2000 | Hoffberg et al. | |
| 6,088,722 A | 7/2000 | Herz et al. | |
| 6,098,065 A | 8/2000 | Skillen et al. | |
| 6,104,705 A | 8/2000 | Ismail et al. | |
| 6,125,230 A | 9/2000 | Yaginuma | |
| 6,133,909 A | 10/2000 | Schein et al. | |
| 6,144,401 A * | 11/2000 | Casement et al. | 725/30 |
| 6,163,316 A | 12/2000 | Killian | |
| 6,172,674 B1 | 1/2001 | Etheredge | |
| 6,177,931 B1 | 1/2001 | Alexander et al. | |
| 6,181,335 B1 | 1/2001 | Hendricks et al. | |
| 6,216,264 B1 | 4/2001 | Maze et al. | |
| 6,240,555 B1 | 5/2001 | Shoff et al. | |
| 6,263,501 B1 | 7/2001 | Schein et al. | |
| 6,268,849 B1 | 7/2001 | Boyer et al. | |
| 6,314,577 B1 | 11/2001 | Pocock | |
| 6,331,877 B1 | 12/2001 | Bennington et al. | |
| 6,388,714 B1 | 5/2002 | Schein | |
| 6,437,836 B1 | 8/2002 | Huang et al. | |
| 6,505,348 B1 | 1/2003 | Knowles et al. | |
| 6,661,468 B2 | 12/2003 | Alten et al. | |
| 6,732,369 B1 | 5/2004 | Schein | |
| 6,850,252 B1 | 2/2005 | Hoffberg | |
| 6,865,746 B1 | 3/2005 | Herrington et al. | |
| 6,904,264 B1 | 6/2005 | Frantz | |
| 7,185,355 B1 | 2/2007 | Ellis et al. | |
| 8,037,505 B2 * | 10/2011 | Ou et al. | 725/91 |
| 2002/0056118 A1 * | 5/2002 | Hunter et al. | 725/87 |
| 2002/0132616 A1 | 9/2002 | Ross et al. | |
| 2003/0040962 A1 * | 2/2003 | Lewis | 705/14 |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0208756 A1 | 11/2003 | Macrae et al. | |
| 2004/0049787 A1 | 3/2004 | Maissel et al. | |
| 2004/0139465 A1 | 7/2004 | Matthews et al. | |
| 2004/0261094 A1 * | 12/2004 | Huslak et al. | 725/25 |
| 2004/0268386 A1 * | 12/2004 | Logan et al. | 725/34 |
| 2005/0015804 A1 * | 1/2005 | LaJoie et al. | 725/44 |
| 2005/0015815 A1 | 1/2005 | Shoff et al. | |
| 2005/0166230 A1 | 7/2005 | Gaydow et al. | |
| 2005/0198677 A1 * | 9/2005 | Lewis | 725/87 |
| 2006/0010470 A1 * | 1/2006 | Kurosaki et al. | 725/46 |
| 2006/0080711 A1 * | 4/2006 | Kim | 725/58 |
| 2006/0156330 A1 * | 7/2006 | Chiu | 725/24 |
| 2007/0136753 A1 | 6/2007 | Bovenschulte et al. | |
| 2007/0180465 A1 * | 8/2007 | Ou et al. | 725/34 |
| 2007/0199040 A1 * | 8/2007 | Kates | 725/134 |
| 2007/0266401 A1 * | 11/2007 | Hallberg | 725/46 |
| 2008/0019485 A1 | 1/2008 | Ellis et al. | |
| 2008/0066106 A1 | 3/2008 | Ellis et al. | |
| 2008/0184315 A1 | 7/2008 | Ellis et al. | |
| 2009/0007198 A1 * | 1/2009 | Lavender et al. | 725/91 |

FOREIGN PATENT DOCUMENTS

| | | |
|---|---|---|
| DE | 42 17 246 | 12/1993 |
| DE | 42 40 187 | 6/1994 |
| DE | 44 40 419 | 5/1996 |
| DE | 195 31 121 | 2/1997 |
| DE | 197 40 079 | 3/1999 |
| EP | 0 721 253 | 7/1996 |
| EP | 0 774 866 | 5/1997 |
| EP | 0 805 594 | 11/1997 |
| EP | 0 854 645 | 7/1998 |
| GB | 1 554 411 | 10/1979 |
| JP | 63-092177 | 4/1988 |
| JP | 04-127688 | 4/1992 |
| JP | 04-227380 | 8/1992 |
| JP | 06-021907 | 1/1994 |
| JP | 07-020254 | 1/1995 |
| JP | 07-123326 | 5/1995 |
| JP | 07-147657 | 6/1995 |
| JP | 08-032538 | 2/1996 |
| JP | 08-125497 | 5/1996 |
| JP | 08-251122 | 9/1996 |
| JP | 08-275077 | 10/1996 |
| JP | 08-289281 | 11/1996 |
| JP | 09-102827 | 4/1997 |
| WO | WO 86/01359 | 2/1986 |
| WO | WO 87/03766 | 6/1987 |
| WO | WO 89/03085 | 4/1989 |
| WO | WO 90/00847 | 1/1990 |
| WO | WO 93/26121 | 12/1993 |
| WO | WO 94/13107 | 6/1994 |
| WO | WO 94/14282 | 6/1994 |
| WO | WO 94/14283 | 6/1994 |
| WO | WO 94/14284 | 6/1994 |
| WO | WO 95/01056 | 1/1995 |
| WO | WO 95/01059 | 1/1995 |
| WO | WO 95/06389 | 3/1995 |
| WO | WO 95/10910 | 4/1995 |
| WO | WO 95/15657 | 6/1995 |
| WO | WO 95/19092 | 7/1995 |
| WO | WO 95/26608 | 10/1995 |
| WO | WO 95/28055 | 10/1995 |
| WO | WO 95/28799 | 10/1995 |
| WO | WO 95/30961 | 11/1995 |
| WO | WO 95/32583 | 11/1995 |
| WO | WO 95/32585 | 11/1995 |
| WO | WO 96/07270 | 3/1996 |
| WO | WO 96/08927 | 3/1996 |
| WO | WO 96/09721 | 3/1996 |
| WO | WO 96/13932 | 5/1996 |
| WO | WO 96/17467 | 6/1996 |
| WO | WO 96/17473 | 6/1996 |
| WO | WO 96/21990 | 7/1996 |
| WO | WO 96/38799 | 12/1996 |
| WO | WO 96/41478 | 12/1996 |
| WO | WO 97/48230 | 12/1997 |

(56) References Cited

FOREIGN PATENT DOCUMENTS

| WO | WO 97/49242 | 12/1997 |
|---|---|---|
| WO | WO 98/10589 | 3/1998 |
| WO | WO 98/16062 | 4/1998 |
| WO | WO 98/17064 | 4/1998 |
| WO | WO 98/26584 | 6/1998 |
| WO | WO 98/43183 | 10/1998 |
| WO | WO 98/48566 | 10/1998 |
| WO | WO 99/01984 | 1/1999 |
| WO | WO 99/14947 | 3/1999 |
| WO | WO 99/30491 | 6/1999 |
| WO | WO 99/45701 | 9/1999 |
| WO | WO 00/04708 | 1/2000 |
| WO | WO 00/05889 | 2/2000 |
| WO | WO 00/28734 | 5/2000 |

OTHER PUBLICATIONS

Brugliera, Vito, "Digital On-Screen Display: A New Technology for the Consumer Interface" (Jun. 1993).

Cox, J., et al., "Extended Services in a Digital Compression System", Proceedings From Eleven Technical Sessions of 42nd Annual Convention and Exposition of the National Cable Television Association, Jun. 1993, pp. 185-191.

"DIRECTV Plus$^2$ System", Thompson Consumer Electronics, Inc. (1999).

DiRosa, S., "BIGSURF Netguide," Jul. 1995, vol. 3.1 (Sections 18, 21, and 28—renumbered as pp. 1-27).

Eitz, Gerhard, "Zukünftige Informations- Und Datenangebote Beim Digitalen Fernsehen—EPG Und "Lesezeichen"," Rundfunktechnische Mitteilungen, vol. 41, pp. 67-72, Jun. 1997.

Instruction Manual *Using StarSight 2*, StarSight Telecast, Inc., 1994.

Kai et al., "Development of a Simulation System for Integrated Services Television", Report from Information Processing Society of Japan, Japan, Sep. 13, 1996, vol. 96, No. 90 p. 13-20.

Leftwich, Jim, Lai, Willy & Schein, Steve, *StarSight Interactive Television Program Guide, Phase IV*, Functional-Interactional Architecture Specification Document, Orbit Interaction, Palo Alto, California, published before Apr. 19, 1995.

What's on Tonight TV Listings Jan. 28, 1995, Retrieved from the Internet: URL: www.scout.wisc.edu-Projects-PastProjects-NH-95-01-31-0018.html> (retrieved on Apr. 28, 2006).

Markowitz, Arthur, "Companies Jump on the Bandwagon", Discount Store News, Dec. 6, 1993, p. 4.

Neumann, Andreas, "WDR Online Aufbau Und Perspektiven Automatisierter Online-Dienste Im WDR," Rundfunktechnische Mitteilungen, vol. 41, pp. 56-66, Jun. 1997.

"Prodigy Launches Interactive TV Listing," Apr. 22, 1994, Public Broadcasting Report.

Rogers, C., "Telcos vs. Cable TV: The Global View," Sep. 1995, Report-Alternative Carriers, Data Communications, No. 13, New York, pp. 75, 76, 78, 80.

Schmuckler, Eric, "A marriage that's made in cyberspace (television networks pursue links with online information services)," May 16, 1994, Mediaweek, v4, n20, p. 22 (3).

Schauer: Internet Article, [Online] Sep. 28, 1995, Retrieved from the Internet: URL: www.vision2020.moscow.com-Archives-1995-9509-0058.htlm>(retrieved on Apr. 28, 2006).

Sussman, Ann, "GTE tunes into home TV shopping", PC Week, Jun. 28, 1988, p. C15(1).

"Technology: Turn on, tune in and print out—An experimental interactive television service is set to alter our viewing habits", Financial Times (London), Oct. 14, 1993, p. 11.

"TV Guide movie database" Internet web pages printed on Aug. 12, 1999.

TV Guide Online Set for Fall, Entertainment Marketing Letter, Aug. 1994.

Wahren, Reinhard "Der Countdown uft: lnteraktives Fernsehen," RFE, pp. 14-16 (Feb. 1994).

Wittig, H. et al.: "Intelligent Media Agents in Interactive Television Systems", Proceedings of the International Conference on Multimedia Computing and Systems, Los Alamitos, CA, US, May 15, 1995-May 18, 1995, pp. 182-189.

* cited by examiner

FIG. 15

General Settings

Record and Purchase Popular Pay Programs: Display Results
Display information about the recorded and purchased programs. To play a recorded and purchased program, highlight it, and press PLAY key on the remote. To display popularity information, highlight the program.

Preferences | Results

Recorded Programs

| Date | Channel | Program | Program Start Program End | Record Duration |
|---|---|---|---|---|
| July 31, 2008 | PPV1 | Rocky IV | 5:00 PM 7:00 PM | 1:58 hour |
| July 31, 2008 | PPV2 | 3:10 to Yuma | 7:00 PM 9:00 PM | 1:57 hour |

Popularity statistics of highlighted program

| Total # of users of the program | Users of the program as % of total # of users | Total number of accesses to the program | Total amount of time users spend on the program |
|---|---|---|---|
| 45,516 | 53% | 105,214 | 34,119 hrs. 24 mins. |

Other popularity data

Programs user may like based on past purchases:

| Date | Channel | Program | Program Start Program End | Record Duration |
|---|---|---|---|---|
| August 1, 2008 | Movie Channel | Knocked Up | 5:00 PM 7:00 PM | 1:44 min |

Time

Exit

Play List

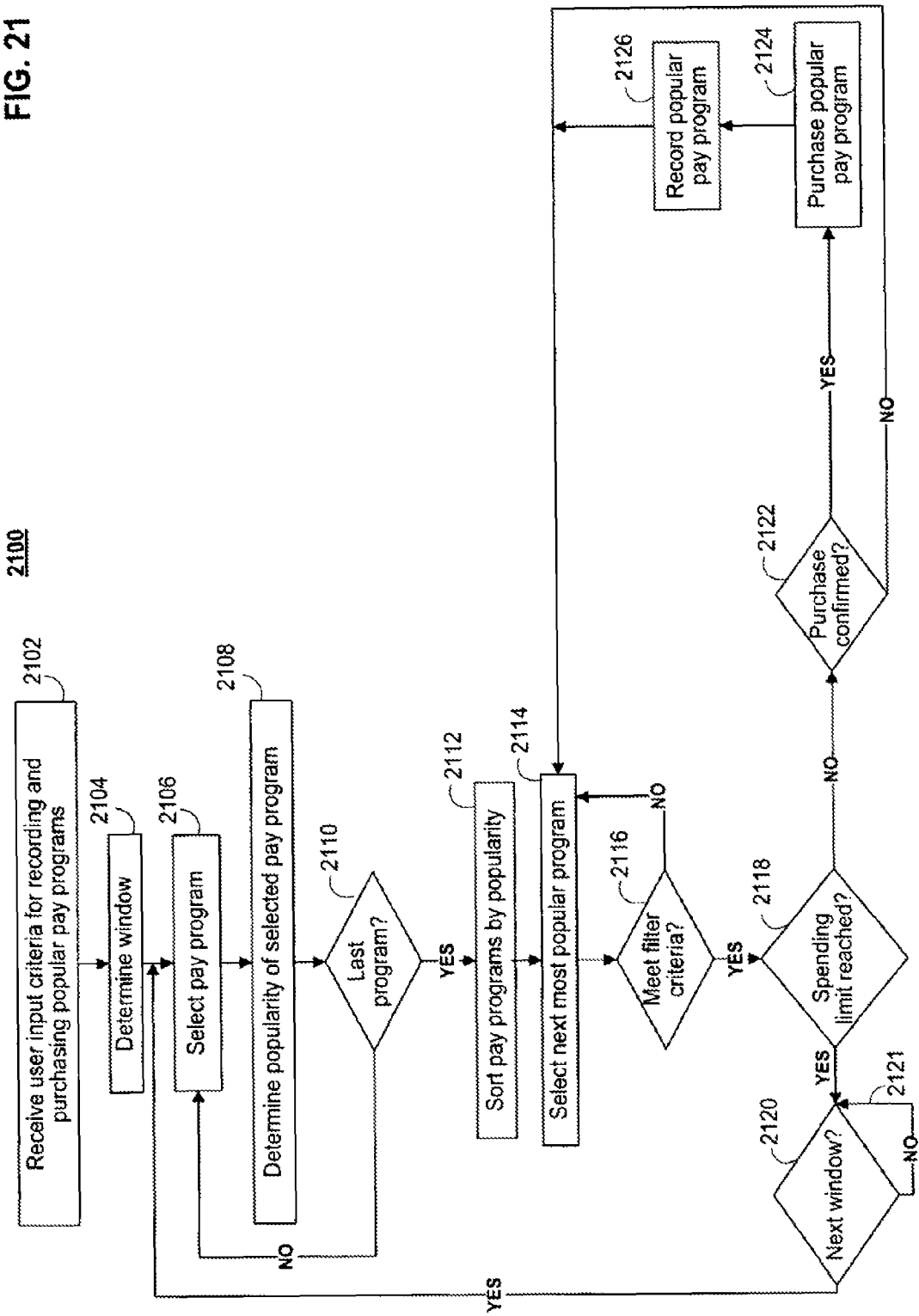

SYSTEMS AND METHODS FOR AUTOMATICALLY PURCHASING AND RECORDING POPULAR PAY PROGRAMS IN AN INTERACTIVE MEDIA DELIVERY SYSTEM

CROSS-REFERENCE TO RELATED APPLICATION

This application is a continuation of U.S. patent application Ser. No. 11/985,847, filed Nov. 16, 2007, which is hereby incorporated by reference herein in its entirety.

BACKGROUND OF THE INVENTION

This invention relates generally to media systems, and more particularly, to systems and methods for automatically purchasing and recording popular pay programs in an interactive media delivery system using interactive media guidance applications.

Pay programs, such as pay-per-view (PPV) programs, pay near-video-on-demand (NVOD) programs, pay video-on-demand (VOD) programs, or other types of pay media not included as part of a user's subscription, are typically distributed to viewers over wired and wireless networks. Viewers may purchase such pay programs and view them, typically in accordance with viewing policies. However, viewers may not have the time to proceed through all the pay programs and purchase desired pay programs.

SUMMARY OF THE INVENTION

In accordance with the principles of the present invention, systems and methods for automatically purchasing and recording popular pay programs are disclosed. The various embodiments described herein, generally speaking, only purchase and record the most popular program that satisfy the defined criteria. Defined criteria may include a time period in which to inquire into the popularity of pay programs, a frequency at which to automatically purchase and record the most popular pay programs within the time period, a time within the time period at which to purchase and record the most popular pay programs, and a spending limit within which to purchase the most popular pay programs. The capability to automatically purchase and record most popular program or programs gives a user the ability to purchase similar pay programs others in the community are purchasing and recording, without the need to proceed through all the pay programs to determine which one to purchase.

Popularity of a pay program may be determined based on any suitable criteria. For example, popularity may simply be based on the number of users currently watching a particular pay program. Alternatively, popularity may be determined based on past views of a particular pay program.

Once popularity of pay program or programs is determined, recording the most popular pay programs is performed under the control of a suitable application, such as an interactive media guidance application running on a user's equipment. Alternatively, recording pay programs may be performed remotely on a server by, e.g., a guidance application server application.

Popular pay programs may be automatically purchased up to a defined spending limit. The spending limit can be user-defined or generated based on past occurrences. In some embodiments, the guidance application will send out a notification that a popular pay program is about to be purchased and prompt the user to confirm. In some embodiments the guidance application will not purchase popular pay programs without user confirmation. In other embodiments, the guidance application may only send out a notification if the guidance application receives a user input to do so, otherwise the guidance application automatically records and purchases popular pay programs up to the defined spending limit.

In some embodiments, all of the most popular pay programs may be recorded, subsequently, the guidance application purchases the most popular pay program or programs up to the defined spending limit. The un-purchased popular pay program or programs are then deleted from the server. In other embodiments, the guidance application purchases the most popular pay program or programs up to the defined spending limit and then records the popular pay program or programs, saving space on remote servers. Such an embodiment would be optimal in cases where the guidance application is running on the user's equipment where space is more limited.

Recording and purchasing may be limited by user-supplied or system defined filters. For example, the media guidance application may receive user inputs defining, or based on monitored user behavior define, genres or other criteria and, in response, only record and purchase popular programs meeting the criteria.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 15 shows an illustrative display provided to display information such as listing of recorded programs, popularity level of a recorded program, and other pay programs the user may want to purchase and record, in accordance with one embodiment of the invention;

FIGS. 17-21 are illustrative process flowcharts of steps involved in purchasing and recording popular pay programs according to various embodiments of the invention.

DETAILED DESCRIPTION OF THE PREFERRED EMBODIMENTS

Figure 1:
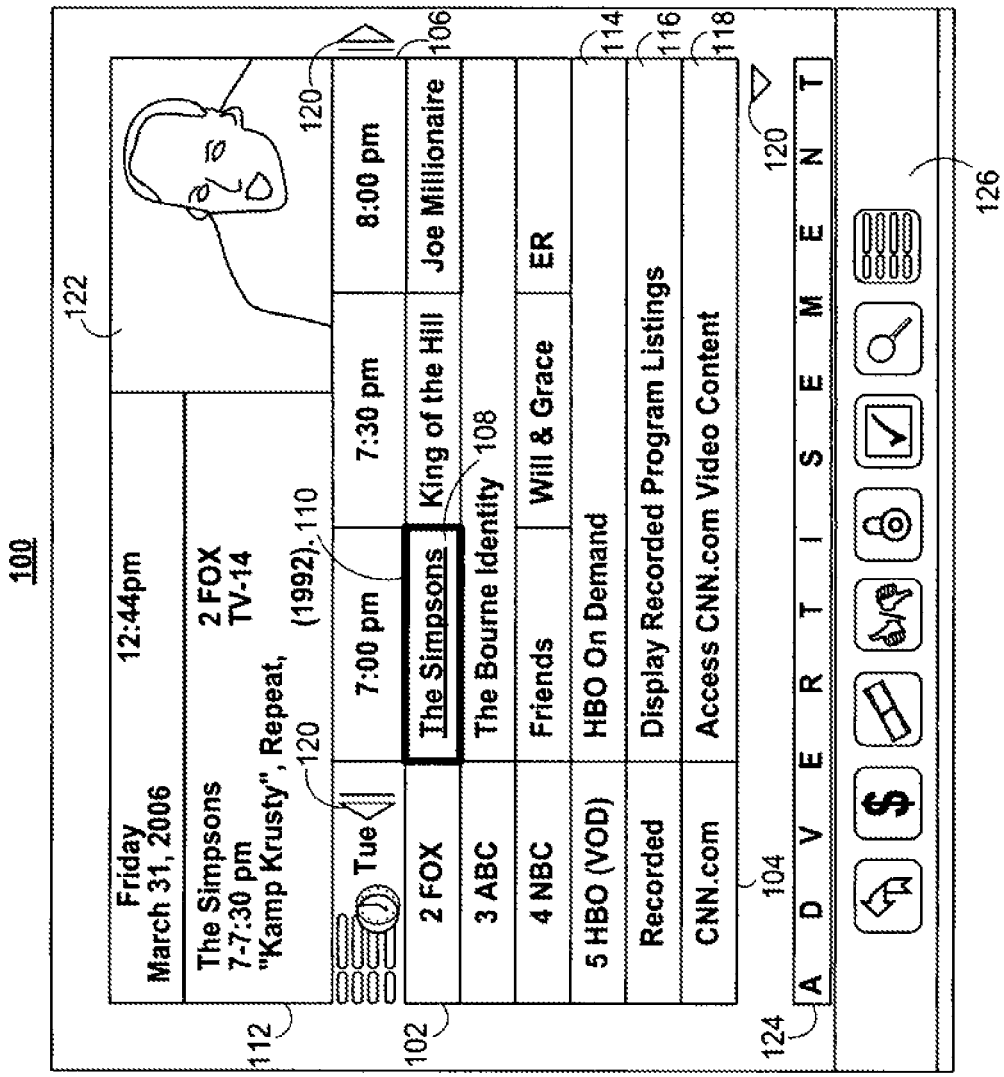
FIGS. 1 and 2 show illustrative displays that may be used to provide interactive media guidance application listings in accordance with one embodiment of the invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

One of the functions of the media guidance application is to provide media listings and media information to users along with allowing users to record and watch saved programs. FIGS. 1-2 and 6-15 show illustrative displays that may be used to provide media guidance, and in particular media listings and recording options. The displays shown in FIGS. 1-2 and 6-15 may be implemented on any suitable device or platform. While the displays of FIGS. 1-2 and 6-15 are illustrated as full-screen displays, they may also be fully or partially overlaid over media content being displayed. A user may indicate a desire to access media information by selecting a selectable option provided in a display (e.g., a menu option, a listings option, an icon, a hyperlink, etc.) or pressing a dedicated button (e.g., a GUIDE button) on a remote control or other user input interface or device. In response to the user's indication, the media guidance application may provide a display with media information organized in one of several ways, such as by time and channel in a grid, by time, by channel, by media type, by category (e.g., movies, sports, news, children, or other categories of programming), recording priority, recording order, or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. Other information and indicators may also be included in grid cells. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information such as whether the program is being recorded, whether there is a scheduling conflict, or any other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP). Non-linear programming content may also include digital images and text based information, digital music and other audio content.

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display listing purchased and recorded popular pay programs such as the display illustrated in FIG. 15, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application displays of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user behavior, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application displays of the present invention.

Options region 126 may allow the user to access different types of media content, media guidance application displays, and/or media guidance application features. Options region 126 may be part of display 100 (and other displays of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, modifying a recording priority of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user behavior to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, recorded popular programs, user-specified broadcast channels based on favorite channel selections, re-ordering the display of channels, recommended media content, etc.), desired recording features (e.g., recording or series recordings for particular users, recording popular programs, recording quality, recording priority of programs, recording and cropping options etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices.

This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Figure 2:
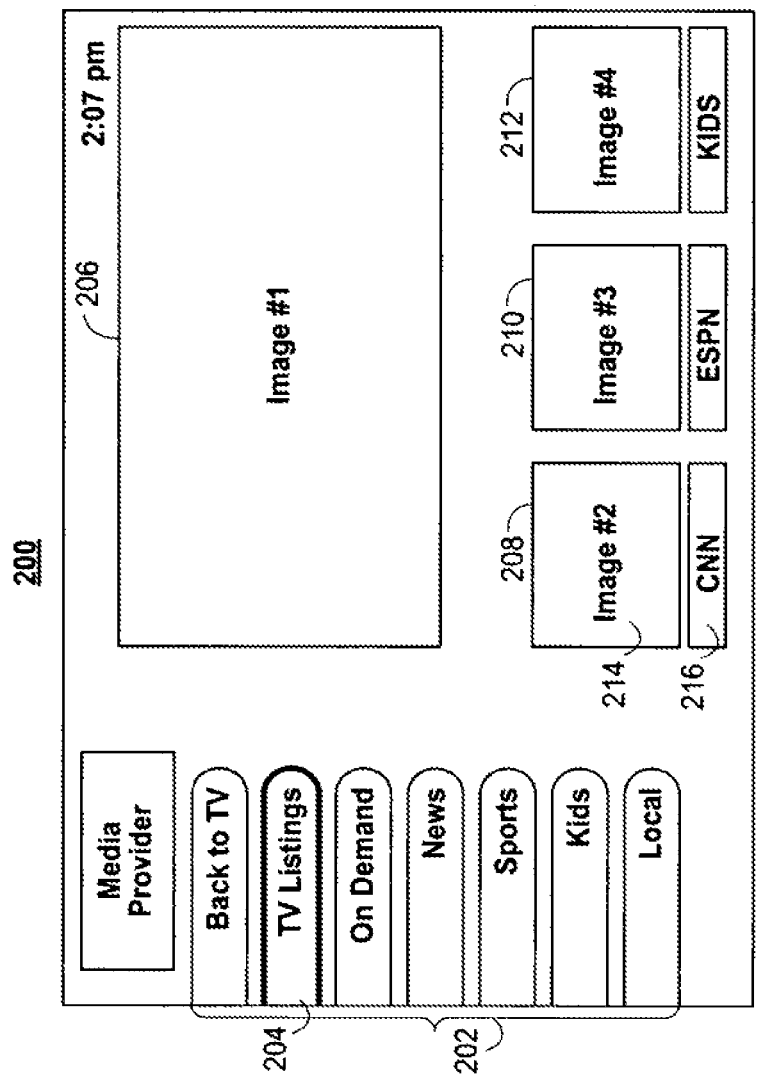

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
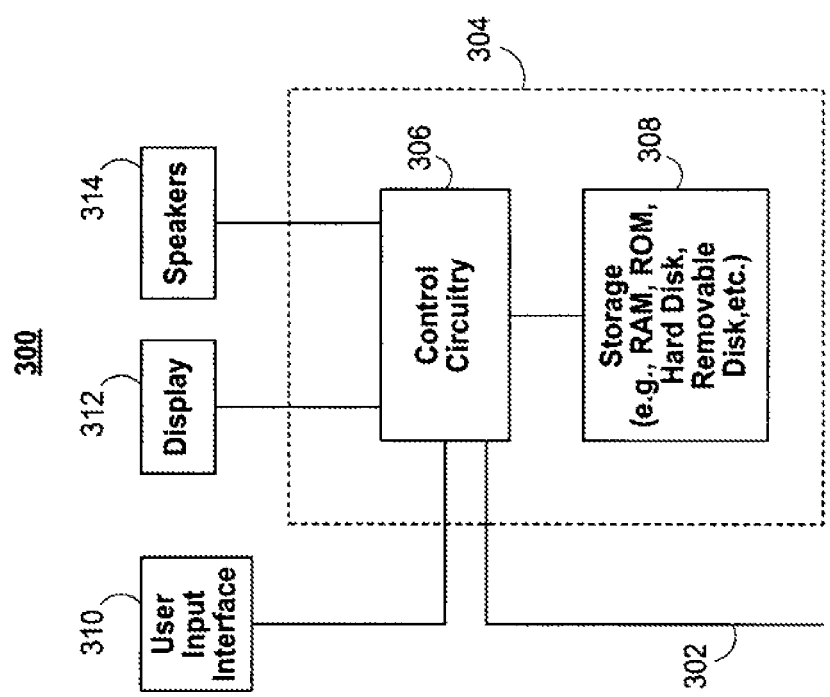
FIG. 3 shows an illustrative user equipment device in accordance with one embodiment of the invention.

Users may access media content and the media guidance application (and its displays described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to dedicate space on and direct recording of information to storage devices (e.g., storage 308), and direct displaying of information on display devices (e.g. display 312). Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server, remote recording server, or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, popularity information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG (e.g., MPEG-2, MPEG-4) decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning, encoding and decoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces.

Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
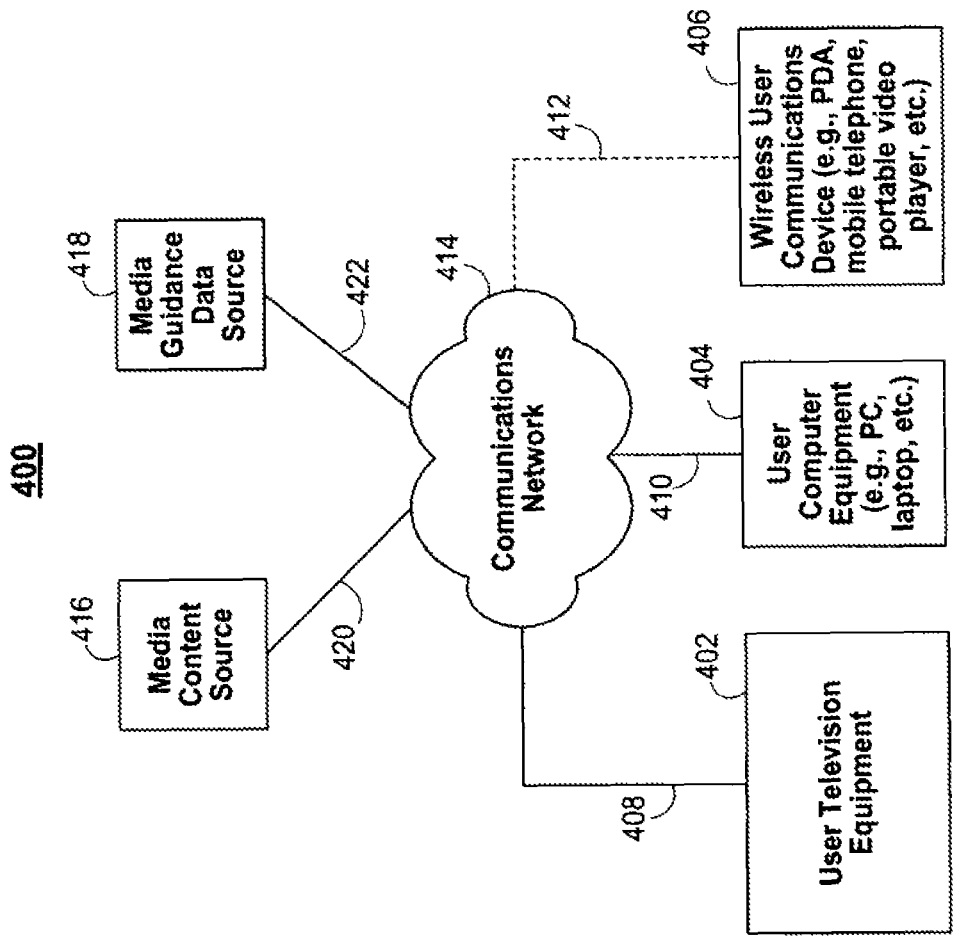
FIG. 4 is a diagram of an illustrative cross-platform interactive media system in accordance with one embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PCs, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user behavior monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication path's, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing.

(The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Popular programs may be recorded on the remote media server in space associated with a user or in shared space used by all users. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, popularity information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data, popularity information, and other guidance data may be provided to the user equipment on a television channel sideband, in the vertical blanking interval of a television channel, using an in-band digital signal, using an out-of-band digital signal, or by any other suitable data transmission technique. Program schedule data, popularity information, and other guidance data may be provided to user equipment on multiple analog or digital television channels. Program schedule data, popularity information, and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 (FIG. 3) of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, are discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 402 and user computer equipment 404 may access the media guidance application to navigate among and locate desirable media content. Users may also access the media guidance application outside of the home using wireless user communications devices 406 to navigate among and locate desirable media content.

It will be appreciated that while the discussion of media content has focused on pay programs, the principles of media guidance can be applied to other types of media content, such as music, images, etc.

Figure 5:
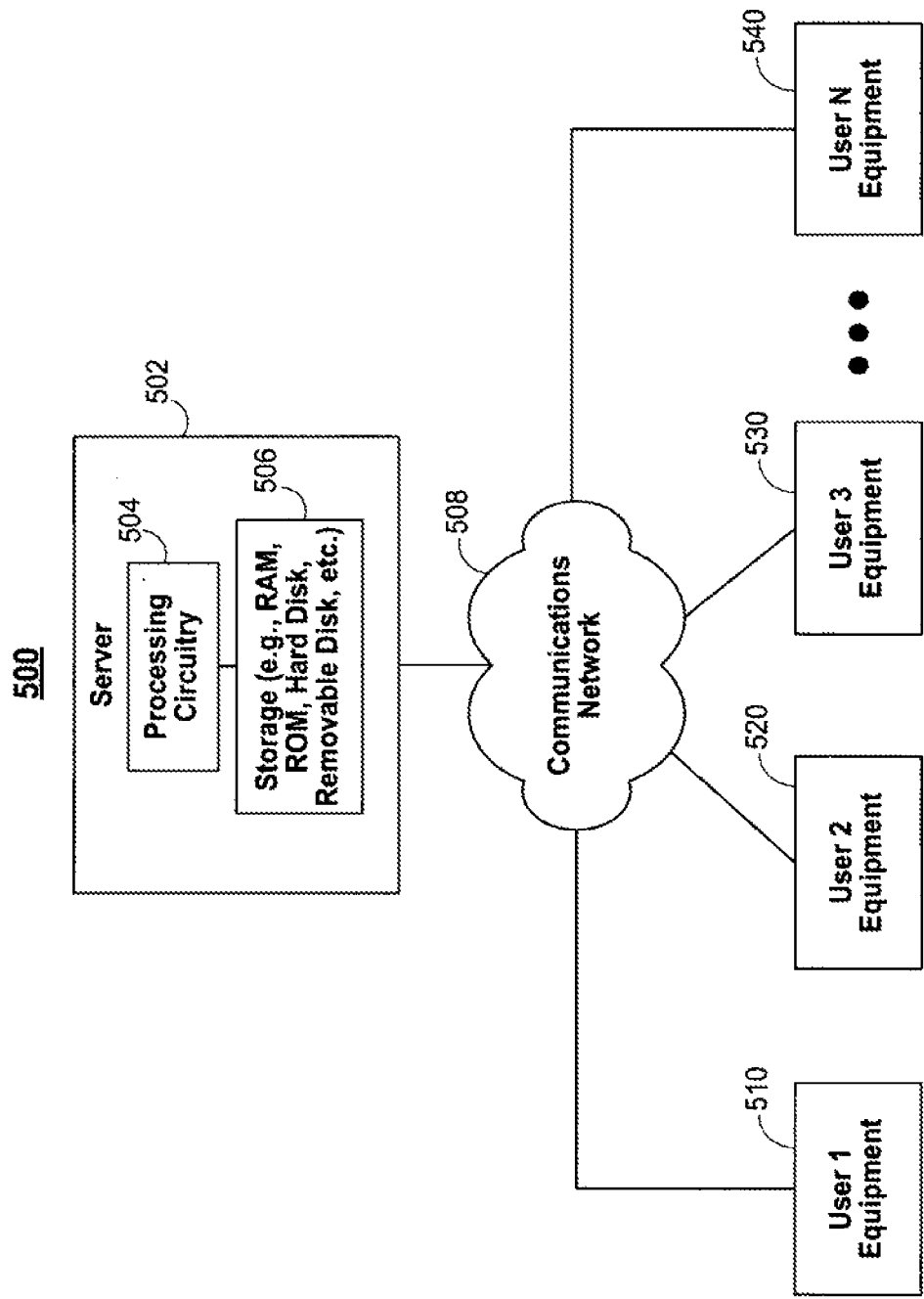
FIG. 5 is a diagram of an illustrative system environment in accordance with one embodiment of the invention.

FIG. 5 shows a diagram of a system that may be used to determine popular programs in accordance with one embodiment of the invention. In particular, FIG. 5 shows equipment of users of an interactive media delivery system connected to remote server 502 via communications network 508. Control circuitry of remote server 502 includes processing circuitry 504 and storage 506. Control circuitry of remote server 502 may be used to send and receive commands, requests, and other suitable data, dedicate space on and direct recording of information to storage devices, and direct displaying of information on display devices. Control circuitry of remote server 502 may be based on any suitable processing circuitry 504 such as processing circuitry based on one or more microprocessors, microcontrollers, digital signal processors, programmable logic devices, etc. In some embodiments, control circuitry of remote server 502 executes instructions for a media guidance application stored in memory (i.e., storage 506). User equipment may include user television equipment 402 (FIG. 4), user computer equipment 404 (FIG. 4), or wireless user communications device 406 (FIG. 4). User equipment is described in connection with FIG. 3. Remote server 502 may be part of media guidance data source 418 (FIG. 4). It receives data indicative of users' program selections from users' equipment (e.g., user equipment 510 to 540 of FIG. 5) connected to it via communications network 508 (FIG. 5). Based on the data, a determination of popular programs is made. For example, user equipment 510 may obtain input via user input interface 310 (FIG. 3) from user 1 to record popular programs among users 2 to N. User equipment 510 transmits user input to remote server 502 (FIG. 5). In one embodiment, remote server 502 processes the data indicative of users 2 to N's program selections to generate identifier data indicative of popular media and transmits the identifier data to user equipment 510. In another embodiment, user equipment 510 receives from remote server 502 popularity information such as data indicative of users 2 to N's program selections and processes the information to generate identifier data indicative of popular media. Popularity information may also be provided by a third party that tracks user activity (e.g., Nielsen). Popular programs among users 2 to N may also be determined by sampling a subset of users (e.g., a statistical sampling indicative of users 3 to N–1's program selections) and then extrapolating from the sample. Any suitable sampling and extrapolation algorithms/techniques may be used. The sampling/extrapolation may be performed, for example, by remote server 502 control circuitry under the control of the instructions of a guidance application server application or a third party (e.g., Nielsen).

Figure 6:
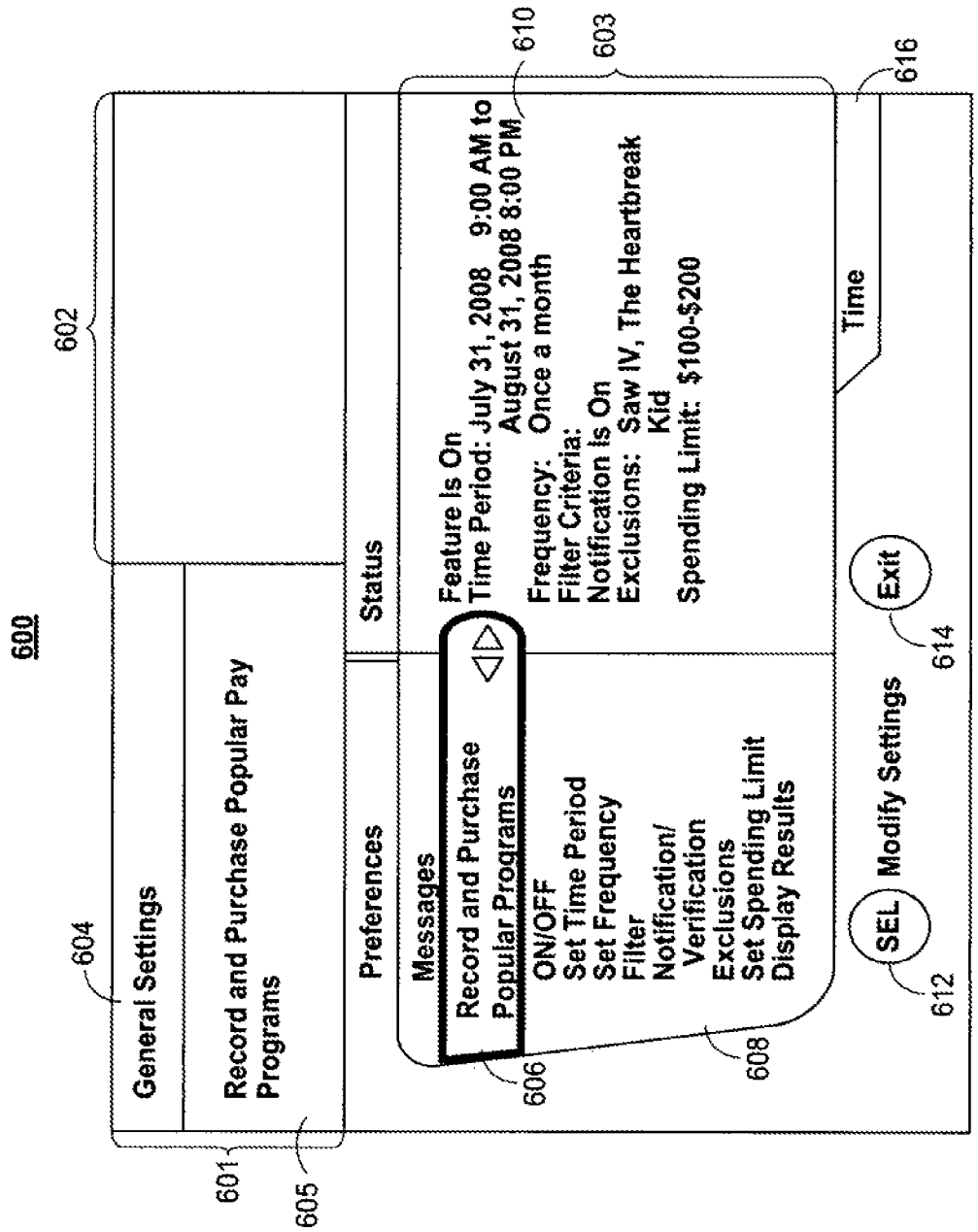
FIG. 6 shows an illustrative display that may be provided to receive user input to set options for purchasing and recording popular pay programs in accordance with one embodiment of the invention.

FIG. 6 shows an illustrative interactive media guidance application display that may be provided to receive user input to set options for automatically recording and purchasing popular pay programs that may be displayed on display 312 (FIG. 3) of user equipment device or media device 402, 404 or 406 (FIG. 4). Options may be set based on, for example, user input or system-generated input such as a user guide data feed, and appropriate warning messages may be displayed if any setting is inappropriate. In particular, FIG. 6 shows an illustrative interactive media guidance application display 600 that includes header region 601 with, header identifier region 604 and description region 605, options selection region 603, and video region 602 (sometimes referred to as a "picture-in-guide" or "PIG" region) that may be used to display videos, messages, or other information. Display regions in the interactive media guidance application can utilize scrolling to display additional information.

In the example of FIG. 6, header region 601 shows the function category that the interactive media guidance application is currently in ("General Settings"). Options selection region 603 includes options region 608 and details region 610. Options region 608 displays available options under a function category and displays available sub-options under an option when the option is highlighted. Details region 610 displays status of an option when the option is highlighted in 608 and displays details of an option when the option is selected in 608. Description region 605 displays a description of a highlighted option. If options for recording and purchasing popular pay programs are set based on user input, a user may input information through user input interface 310 (FIG. 3). Highlighting an option in 608 may be accomplished, for example, by navigating through user input interface 310 (FIG. 3) until the desired option is highlighted on display 312 (FIG. 3). Selecting an option in 608 may be accomplished, for example, by pressing a select button (indicated by 612) on user input interface 310 (FIG. 3) when the desired option is highlighted. In the example of FIG. 6, option "Record and Purchase Popular Pay Programs" 606 under function category "General settings" is highlighted in options region 608. Accordingly, options region 608 displays available sub-options under "Record and Purchase Popular Pay Programs," details region 610 displays the status of the sub-options, and description region 605 displays a description for the "Record and Purchase Popular Pay Programs" option. Exiting display 600 may be accomplished, for example, by pressing an exit button (indicated by 614) on user input interface 310. Any other suitable options may be included in options region 608. For example, "Pop-Up Alerts" may be included as a sub-option under "Record and Purchase Popular Pay Programs" and listed below "Display Results" in region 608. When "Pop-Up Alerts" is on, it will pop up a display, for example, to alert a current viewer/user that the credit card is about to expire and to change some information. The exact details for "Pop-Up Alerts" may be set using a display similar to the "Notification" display (the "Notification" display is discussed in connection with FIG. 12). Box 616 displays the current time.

Figure 7:
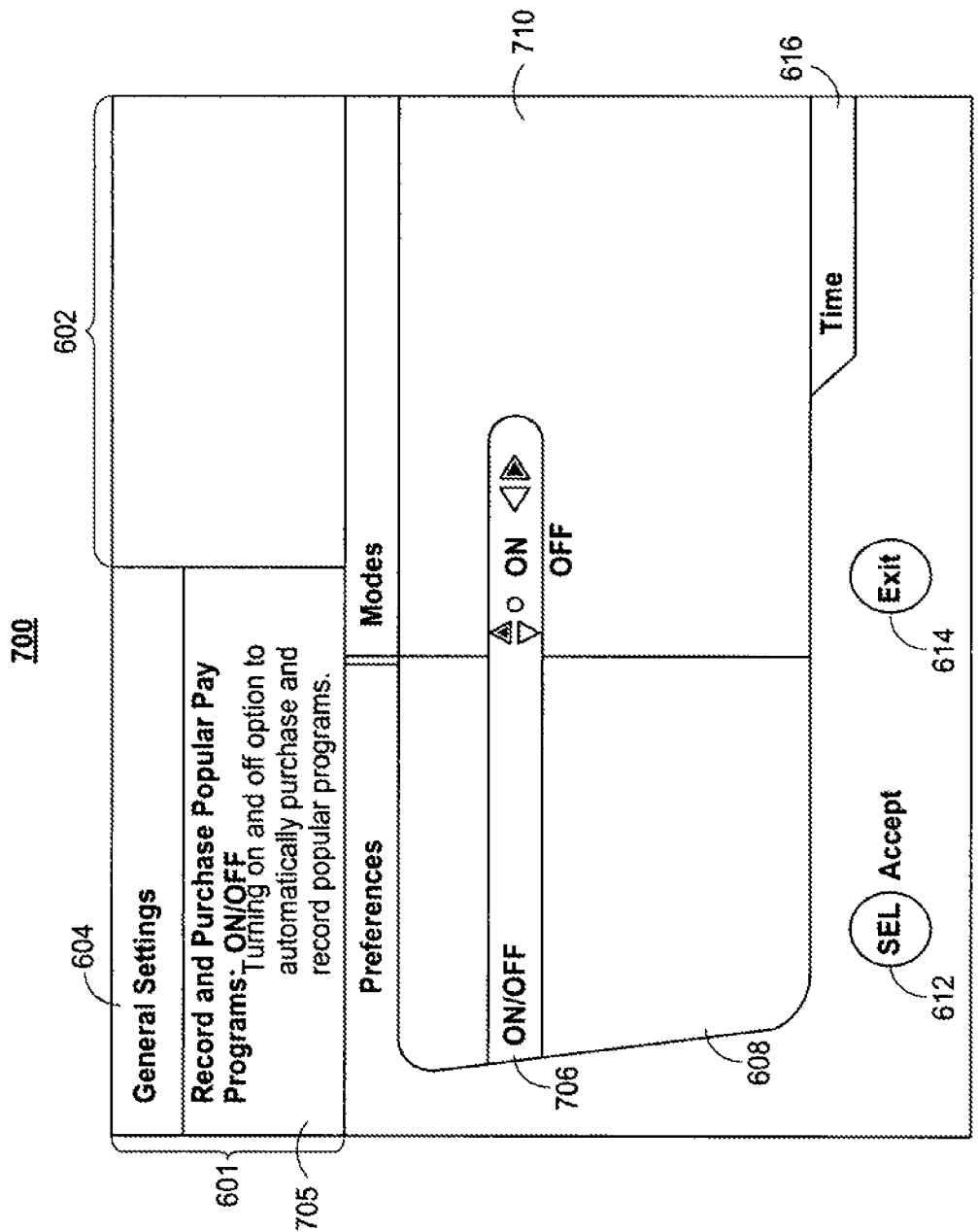
FIG. 7 shows an illustrative display provided to receive user input to turn the purchasing and recording of popular pay programs on or off in accordance with one embodiment of the invention.

FIG. 7 shows an illustrative interactive media guidance application display that may be provided to receive user input to turn the recording and purchasing of popular pay programs option on or off. This display may be displayed on display 312 (FIG. 3) of user equipment device or media device 402, 404 or 406 (FIG. 4). In particular, FIG. 7 shows an illustrative interactive media guidance application display 700 that is displayed after the "On/Off" sub-option of "Record and Purchase Popular Pay Programs" is highlighted and selected in FIG. 6. Description region 705 shows a description of the selected option. Options region 608 shows the selected option 706. Details region 710 shows settings ("ON" or "OFF") for the selected option. Turning on the "Record and Purchase Popular Pay Programs" option, for example, may be accomplished by pressing a select button (indicated by 612) on user input interface 310 (FIG. 3). In the example of FIG. 7, turning off the "Record and Purchase Popular Pay Programs" option may be accomplished by navigating through user input interface 310 (FIG. 3) until the desired setting ("OFF") is highlighted on display 700 and then selecting the setting by pressing a select button (indicated by 612) on user input interface 310 (FIG. 3).

Figure 8:
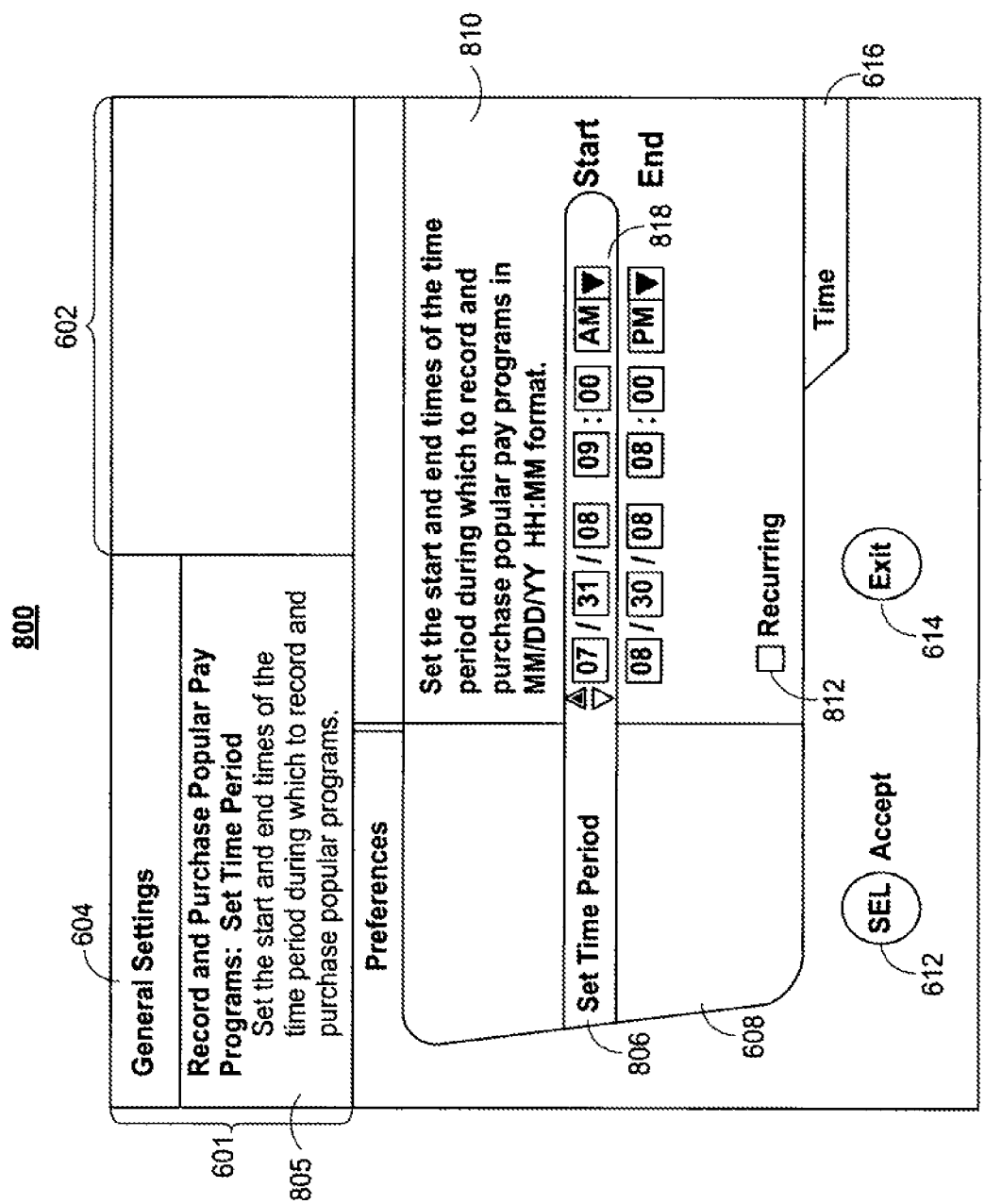
FIG. 8 shows an illustrative display provided to receive user input to set a defined time period for which popular pay programs are determined and recorded in accordance with one embodiment of the invention.

FIG. 8 shows an illustrative interactive media guidance application display that may be provided to receive user input to set start and end times of a defined time period for which popular pay programs are determined, purchased and recorded. This display may be displayed on display 312 (FIG. 3) of user equipment device or media device 402, 404 or 406 (FIG. 4). In particular, FIG. 8 shows an illustrative interactive media guidance application display 800 that is displayed after the "Set Time Period" sub-option of "Record and Purchase Popular Pay Programs" is highlighted and selected in FIG. 6. Description region 805 shows a description of the selected option. Options region 608 shows the selected option 806. Details region 810 shows available settings for the selected option. Setting the start time, for example, may be accomplished by highlighting available setting 818 using the navigational features of user input interface 310 (FIG. 3) and entering the desired date and time in the appropriate fields using user input interface 310 (FIG. 3). Setting the end time follows a similar procedure. Pressing a select button (indicated by 612) on user input interface 310 (FIG. 3) accepts the settings just entered. In the example of FIG. 8; details region 810 shows that start time is set to be 9:00 AM on Jul. 31, 2008 and the end time is set to be 8:00 PM on Aug. 30, 2008. If an inappropriate time period (e.g., end time occurs earlier than start time) is entered, the interactive media guidance application may display an appropriate warning message on display 312 (FIG. 3). The "Set Time Period" option may allow other suitable features, such as allowing the user to recur the current setting by the same span currently configured. For example, user may checkmark checkbox 812 labeled "Recurring.". The interactive media guidance application may then recur the current 30-day setting for the next 30 days automatically. The interactive media application would record and purchase popular pay programs in the same time period until the user de-selects checkbox 812 or until any suitable time. Although the discussion of FIG. 8 refers to the options as set by a user, the system may automatically set an appropriate, defined time period as well (e.g., one week, every time user television is off, or continuous for as long as the "Record and Purchase Popular Pay Programs" option is on).

Figure 9:
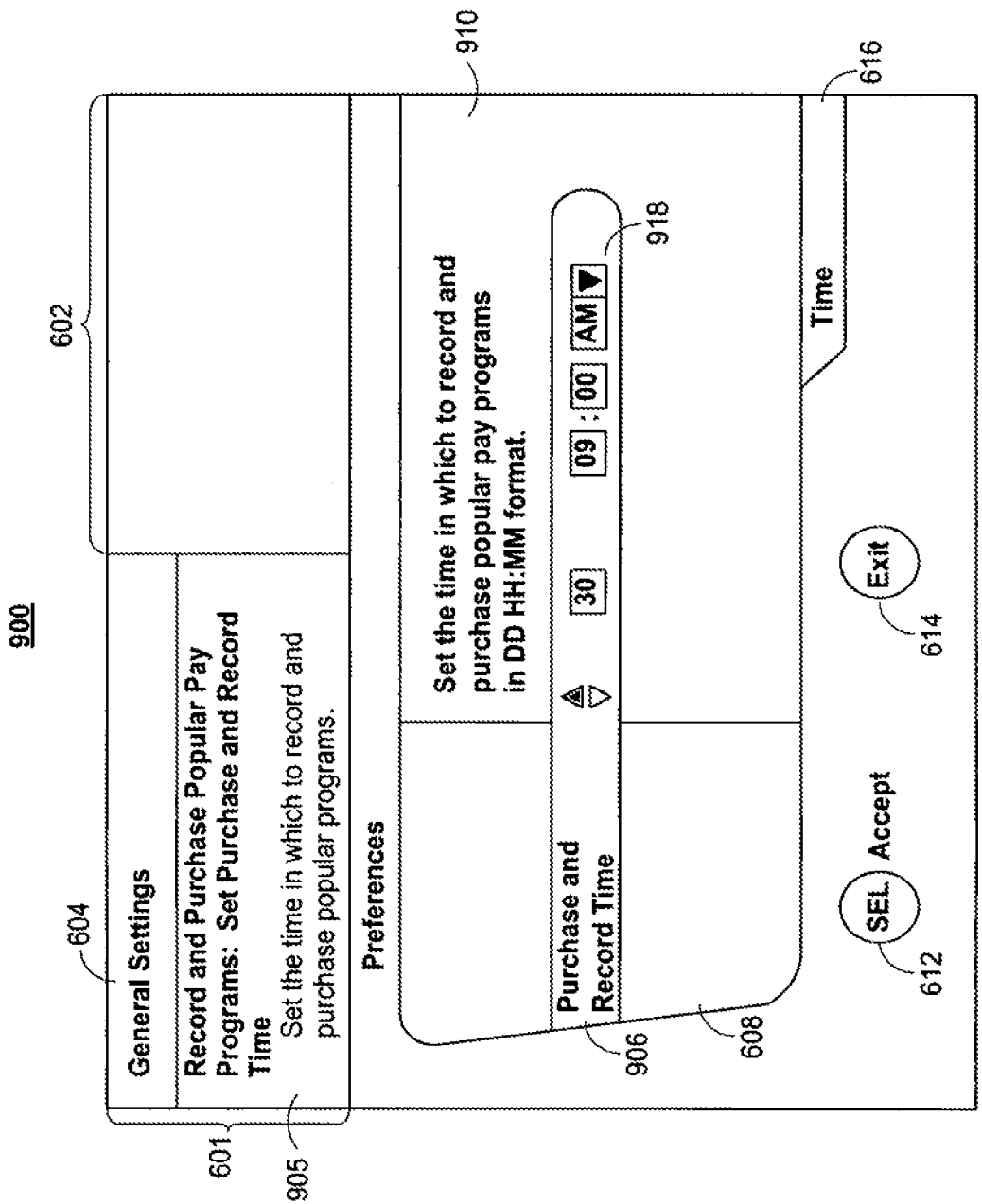
FIG. 9 shows an illustrative display provided to receive user input to set a time within the time period to purchase and record popular pay programs in accordance with one embodiment of the invention.

FIG. 9 shows an illustrative interactive media guidance application display that may be provided to receive user input to set the day and time within the time period in which to record and purchase popular pay programs. This display may be displayed on display 312 (FIG. 3) of user equipment device or media device 402, 404 or 406 (FIG. 4). In particular, FIG. 9 shows an illustrative interactive media guidance application display 900 that is displayed after the "Set Purchase Time" sub-option of "Record and Purchase Popular Pay Programs" is highlighted and selected in FIG. 6. Description region 905 shows a description of the selected option. Options region 608 shows the selected option 906. Details region 910 shows available settings for the selected option. Setting the time within the time period to record and purchase pay programs, for example, may be accomplished by highlighting available setting 918 using the navigational features of user input interface 310 (FIG. 3) and entering the desired day and time in the appropriate fields using user input interface 310 (FIG. 3). Pressing a select button (indicated by 612) on user input interface 310 (FIG. 3) accepts the settings just entered. Other ways to define the time period may be presented by the interactive media guidance application, such as every time user television is off. In the example of FIG. 9, details region 910 is set to record and purchase time within the time period at 9:00 AM on Aug. 30, 2008.

Figure 10:
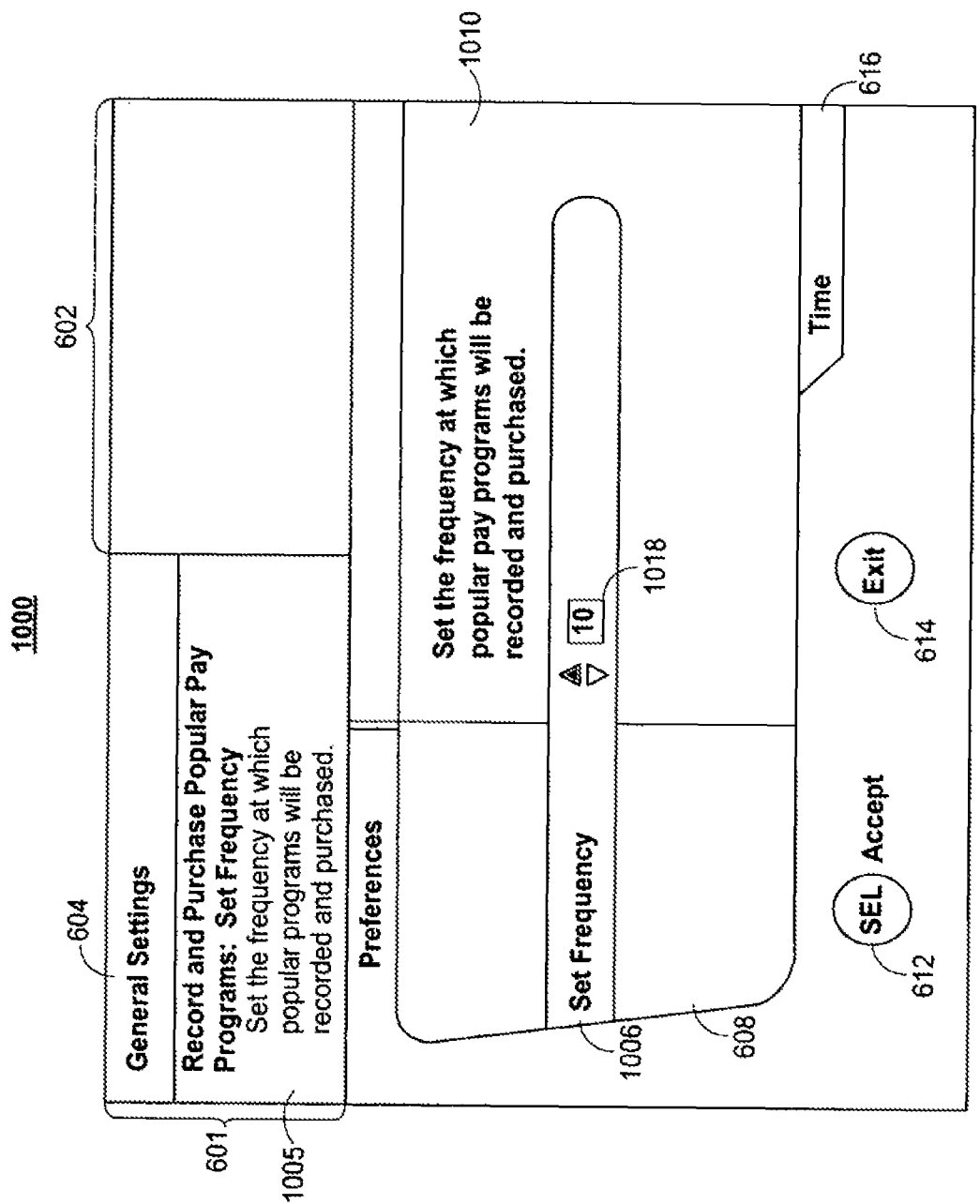
FIG. 10 shows an illustrative display provided to receive user input to set the frequency at which to purchase and record popular pay programs in accordance with one embodiment of the invention.

FIG. 10 shows an illustrative interactive media guidance application display that may be provided to receive user input to set the frequency at which to purchase and record popular pay programs. This display may be displayed on display 312 (FIG. 3) of user equipment device or media device 402, 404 or 406 (FIG. 4). In particular, FIG. 10 shows an illustrative interactive media guidance application display 1000 that is displayed after the "Set Frequency" sub-option of "Record and Purchase Popular Pay Programs" is highlighted and selected in FIG. 6. Description region 1005 shows a description of the selected option. Options region 608 shows the selected option 1006. Details region 1010 shows available settings for the selected option. Setting the frequency to record and purchase pay programs, for example, may be accomplished by highlighting available setting 1018 using the navigational features of user input interface 310 (FIG. 3) and entering the desired numerical value in the appropriate fields using user input interface 310 (FIG. 3). Pressing a select button (indicated by 612) on user input interface 310 (FIG. 3) accepts the settings just entered. In the example of FIG. 10, 10 is set as the frequency at which to record and purchase pay programs. Although the discussion of FIG. 10 refers to the options as set by a user, the system may automatically set options (e.g., based on monitored default values). For example, if a user fails to enter a frequency, the system may select 1 as its default frequency in which to purchase and record popular pay programs within the time period.

Figure 11:
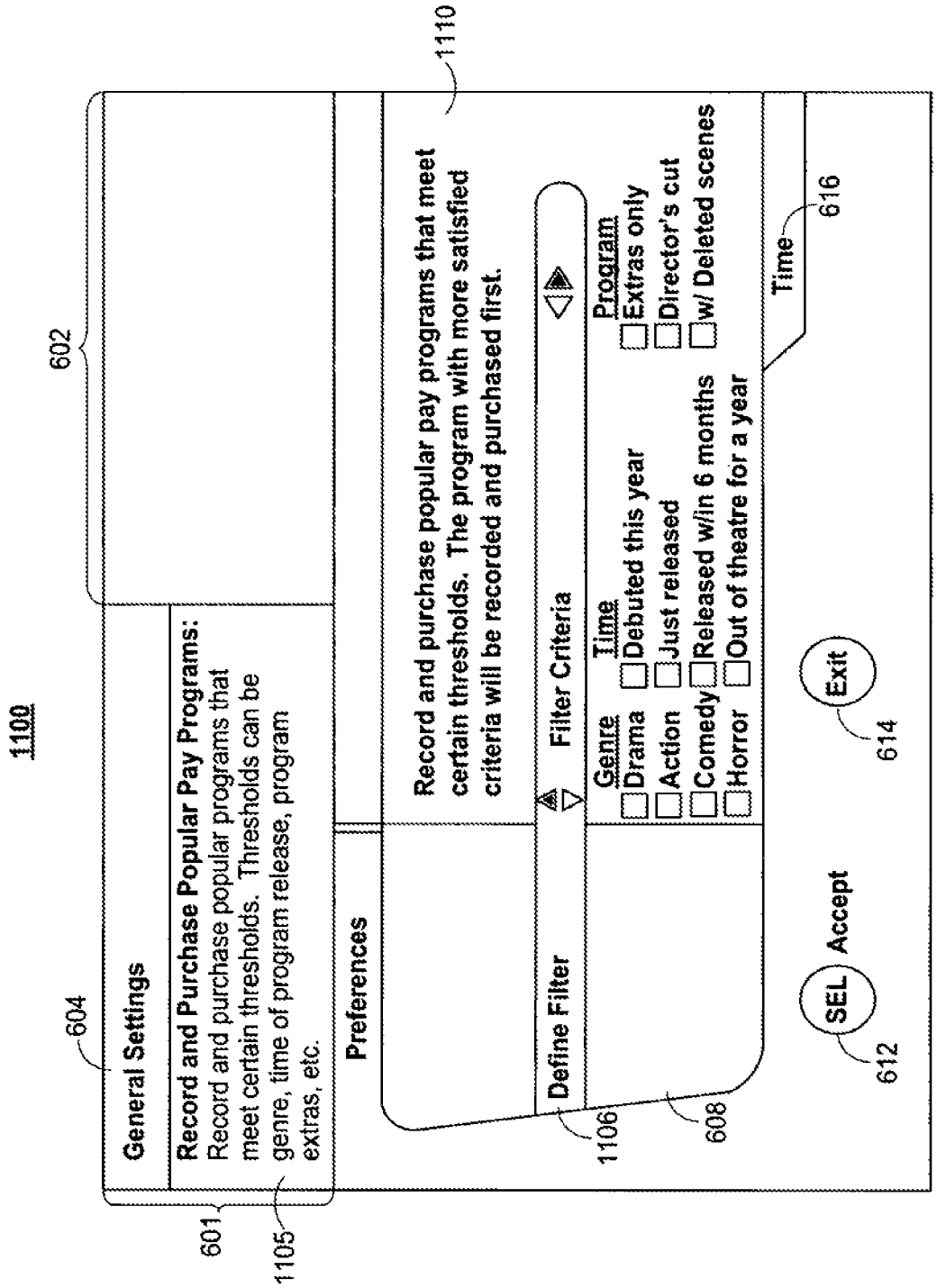
FIG. 11 shows an illustrative display provided to receive user input to filter selections, from purchasing and recording, pay programs that are inconsistent with user preferences in accordance with one embodiment of the invention.

FIG. 11 shows an illustrative interactive media guidance application display that may be provided to receive user input to filter selections, from automatic purchasing and recording, pay programs that are inconsistent with user preferences. This display may be displayed on display 312 (FIG. 3) of user equipment device or media device 402, 404 or 406 (FIG. 4). In particular, FIG. 11 shows an illustrative interactive media guidance application display 1100 that is displayed after the "Define Filter" sub-option of "Record and Purchase Popular Pay Programs" is highlighted and selected in FIG. 6. Description region 1105 shows a description of the selected option. Options region 608 shows the selected option 1106. Details region 1110 shows available settings for the selected option. Setting the filter, for example, may be accomplished by navigating within region 1110 using the navigational features of user input interface 310 (FIG. 3) and checking the appropriate checkboxes using user input interface 310 (FIG. 3). Pressing a select button (indicated by 612) on user input interface 310 (FIG. 3) accepts the settings just entered. In the example of FIG. 11, the user may filter only comedies released within the last year for recording and purchase by the guidance application by checking the appropriate checkboxes. Although the discussion of FIG. 11 refers to the options as set by a user, the system may automatically set options (e.g., based on monitored user behavior, etc.). For example, if monitored user behavior indicates that user likes the situation comedy genre released within the past year, the system may set options such that only popular pay situation comedies that are released within the past year are recorded and purchased.

Figure 12:
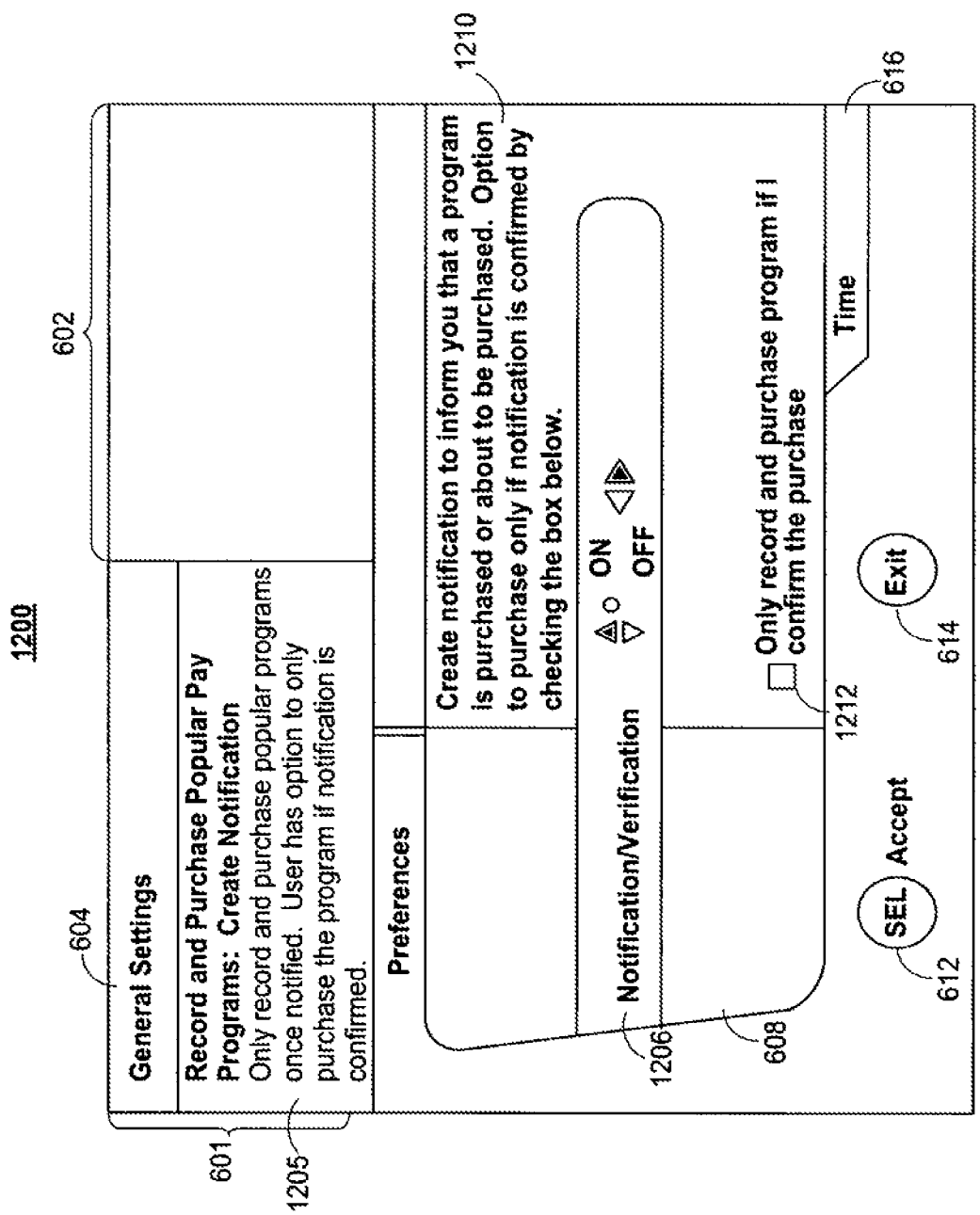
FIG. 12 shows an illustrative display provided to receive user input to turn notifications before purchasing and recording pay programs on or off in accordance with one embodiment of the invention.

FIG. 12 shows an illustrative interactive media guidance application display for receiving input to allow the user to turn notifications on or off, before purchasing and recording pay programs. For example, a user may have set the defined spending limit to be high (e.g., $2,000). To ensure that only pay programs that the user has not seen yet are recorded and purchased, the user may require the guidance application to notify the user of potential pay programs for record and purchase and not to proceed with record and purchase until confirmation is given.

In particular, FIG. 12 shows an illustrative interactive media guidance application display 1200 that is displayed after the "Notification/Verification" sub-option of "Record and Purchase Popular Pay Programs" is highlighted and selected in FIG. 6. Description region 1205 shows a description of the selected option. Options region 608 shows the selected option 1206. Details region 1210 shows available settings for the selected option. Details region 1210 shows available settings for the selected option. Details region 1210 shows settings ("ON" or "OFF") for the selected option. Turning on the "Notification/Verification" option, for example, may be accomplished by pressing a select button (indicated by 612) on user input interface 310 (FIG. 3). In the example of FIG. 12, turning off the "Notification/Verification" option may be accomplished by navigating through user input interface 310 (FIG. 3) until the desired setting ("OFF") is highlighted on display 1200 and then selecting the setting by pressing a select button (indicated by 612) on user input interface 310 (FIG. 3). The user may checkmark checkbox 1212 to ensure that the guidance application will not automatically record and purchase popular pay programs without receiving a confirmation from the user. (See FIG. 16 for a illustrative display of the notification described herein). In this case, the user selected to be notified onscreen. In other embodiments, the notification can be sent to a media device 402 such as a cell phone or PDA through communication path 412 and communication network 414.

Figure 13:
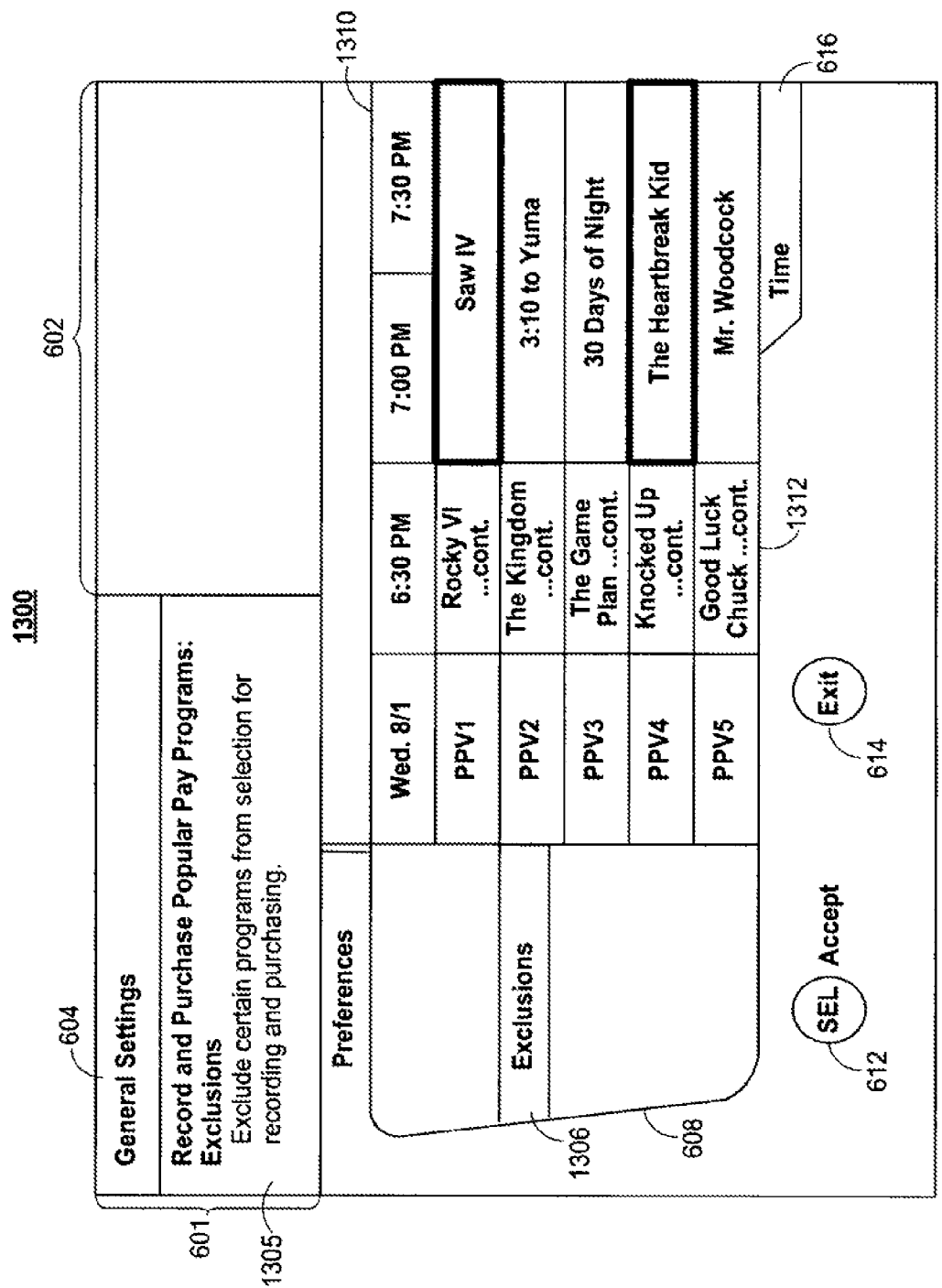
FIG. 13 shows an illustrative display to receive user input to exclude certain pay programs from selection for purchasing and recording in accordance with one embodiment of the invention.

FIG. 13 shows an illustrative interactive media guidance application display that may be provided to receive user input to exclude programs from automatic selection for recording and purchasing. For example, a user who does not like sports may exclude a boxing match, a pay program likely to be popular by most popularity criteria, from selection for recording and purchasing. This exclusions display may be displayed on display 312 (FIG. 3) of user equipment device or media device 402, 404 or 406 (FIG. 4). Control circuitry 306, (e.g., under the control of the instructions of an interactive media application) in user equipment 510 or processing circuitry 504 in remote server 502 may be configured to exclude programs from selection for recording.

In particular, FIG. 13 shows an illustrative interactive media guidance application display 1300 that is displayed after the "Exclusions" sub-option of "Record and Purchase Popular Pay Programs" is highlighted and selected in FIG. 6. Description region 1305 shows a description of the selected option. Options region 608 shows the selected option 1306. Details region 1310 shows available settings for the selected option. The size, shape, layout and contents of the cells in details region 1310 may be similar to those of the grid 102 in FIG. 1. Region 1310 includes cells of program listings, such as program listing 1312 for "Saw IV." A user who likes horror films and checkmarks the horror genre in detail region 1110 (FIG. 11) may dislike a particular movie within the horror genre. The guidance application allows the user to exclude Saw IV from selection for recording by highlighting it in program listing 1312 using the navigational features of user input interface 310 (FIG. 3) and pressing a select button (indicated by 612) on user input interface 310 (FIG. 3) to accept this setting. Additional programs may be excluded using a similar procedure. In this example, "The HeartBreak Kid" is selected. The "Exclusions" option may allow programs to be excluded based on additional suitable criteria (e.g., no programs from certain genres, etc.). Although the discussion of FIG. 13 refers to the options as set by a user, the system may automatically set options (e.g., based on monitored user behavior, etc.). For example, if monitored user behavior indicates that user does not like the horror film genre, the system may set options to exclude all horror pay programs as indicated by a user guide data feed.

Figure 14:
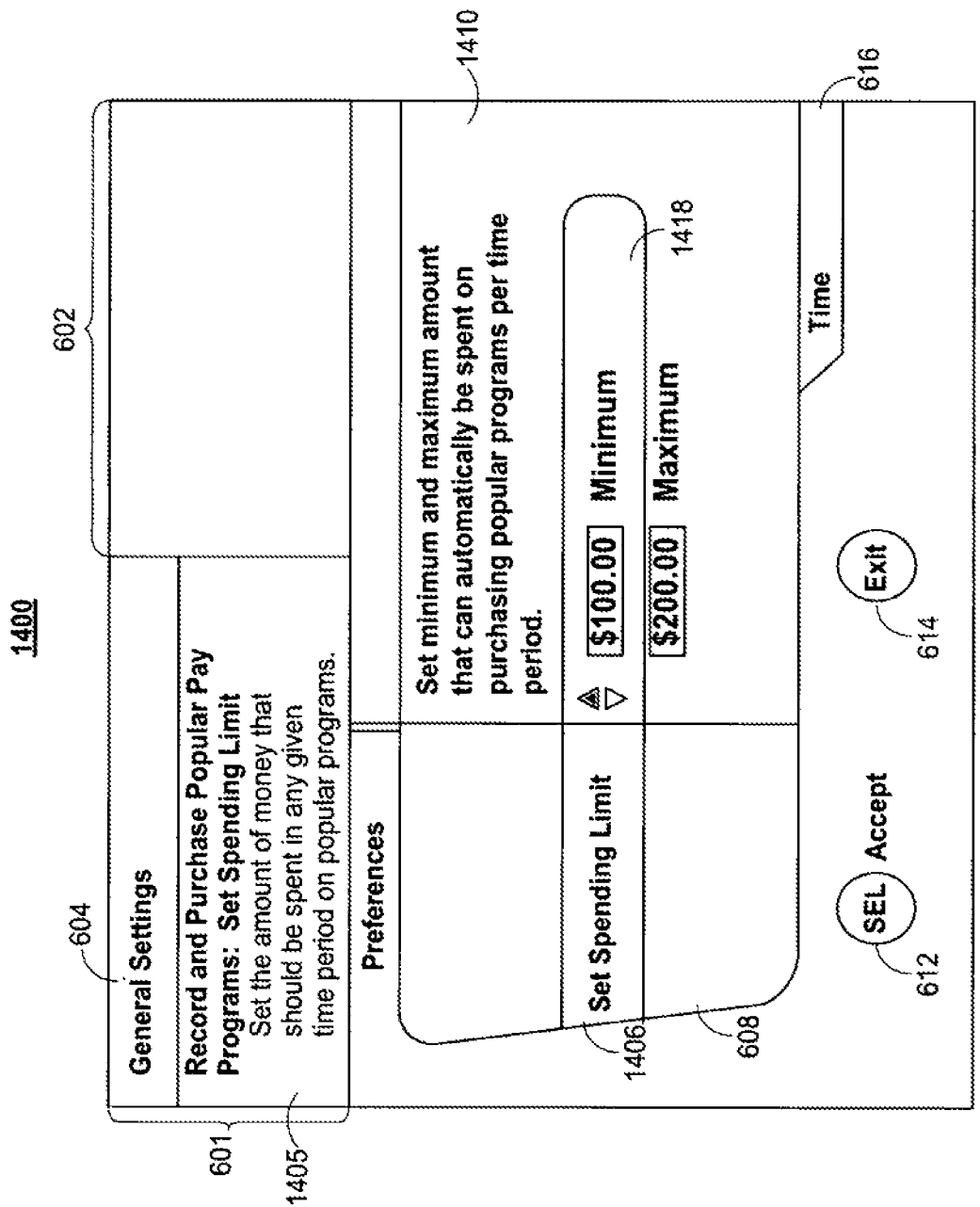
FIG. 14 shows an illustrative display provided to receive user input to set purchasing spending limits for popular pay programs in accordance with one embodiment of the invention.

FIG. 14 shows an illustrative interactive media guidance application display that may be provided to receive user input to set spending limits for recording an purchasing popular pay programs. This display may be displayed on display 312 (FIG. 3) of user equipment device or media device 402, 404 or 406 (FIG. 4). In particular, FIG. 14 shows an illustrative interactive media guidance application display 1400 that is displayed after the "Set Spending Limit" sub-option of "Record and Purchase Popular Pay Programs" is highlighted and selected in FIG. 6. Description region 1405 shows a description of the selected option. Options region 608 shows the selected option 806. Details region 1410 shows available settings for the selected option. Setting the minimum limit for purchasing popular pay programs, for example, may be accomplished by highlighting available setting 1418 using the navigational features of user input interface 310 (FIG. 3) and entering the desired date and time in the appropriate fields using user input interface 310 (FIG. 3). Setting the maximum limit for purchasing popular pay programs follows a similar procedure. Pressing a select button (indicated by 612) on user input interface 310 (FIG. 3) accepts the settings just entered. In the example of FIG. 14, details region 1410 shows that minimum amount is set to $100 and the maximum amount is set to $200. If an inappropriate amount (e.g., maximum is less than the minimum) is entered, the interactive media guidance application may display an appropriate warning message on display 312 (FIG. 3). Although the discussion of FIG. 14 refers to the options as set by a user, the system may automatically set an appropriate, defined spending limit as well (e.g., based on at least 3 prior user entries).

FIG. 15 shows an illustrative interactive media guidance application display to display information about the recorded and purchased programs and to play the recorded and purchased programs. This display may be displayed on display 312 (FIG. 3) of user equipment device or media device 402, 404 or 406 (FIG. 4). In particular, FIG. 15 shows an illustrative interactive media guidance application display 1500 that is displayed after the "Display Results" sub-option of "Record and Purchase Popular Pay Programs" is highlighted and selected in FIG. 6. Description region 1505 shows a description of the selected option. Options region 608 shows the selected option 1506. Details region 1510 shows the information provided by the selected option and reflects the results of settings shown in FIGS. 8-14. Additional information, if available, may be displayed as well (e.g. popularity of the recorded programs among all users of the interactive media delivery system). The information may be displayed in any suitable format. For example, details region 1510 may simply show a listing of recorded programs only. A user may highlight a program from the listing using the navigational features of user input interface 310 of FIG. 3 (e.g., a remote control) and press an info button to get a separate display with information related to the highlighted program and its users.

In the example of FIG. 15, the "Recorded Programs" display region 1512 lists programs recorded and purchased. Two programs are shown in 1512 and additional recorded programs can be shown by using the scroll bar on the right. Programs that are currently being recorded and purchased may also be displayed, and indicators may be used to show that recording and purchasing is in progress and options to view those programs live may be provided. Highlighting a program using the navigational features of user input interface 310 (FIG. 3) displays information such as popularity statistics of the highlighted program (1516), statistics on viewers/users of the highlighted program, other pay programs the user may like based on past purchases (1518). Other popularity information, such as other user demographic information, may be displayed as well (1517). Remote server 502 may also keep track of the total number of times a user accesses a particular program or the total time a user spends on a program by communicating with the user's equipment via communications network 508 (FIG. 5). Remote server 502 (FIG. 5) aggregates these individual pieces of data to obtain popularity statistics on a program.

In the example of FIG. 15, the first program (1515) was shown on channel PPV1 from 5:00 PM to 7:00 PM on Jul. 31, 2008. One hour 58 minutes of the program was recorded. The second program (1516) was shown on channel PPV2 from 7:00 PM to 9:00 PM on Jul. 31, 2008. To play a recorded pay program, user may press a play button on a remote control that is part of user input interface 310 (FIG. 3) when the program is highlighted in 1510. To play all recorded programs, user may select "Play List" button 1540 (FIG. 13).

Figure 16:
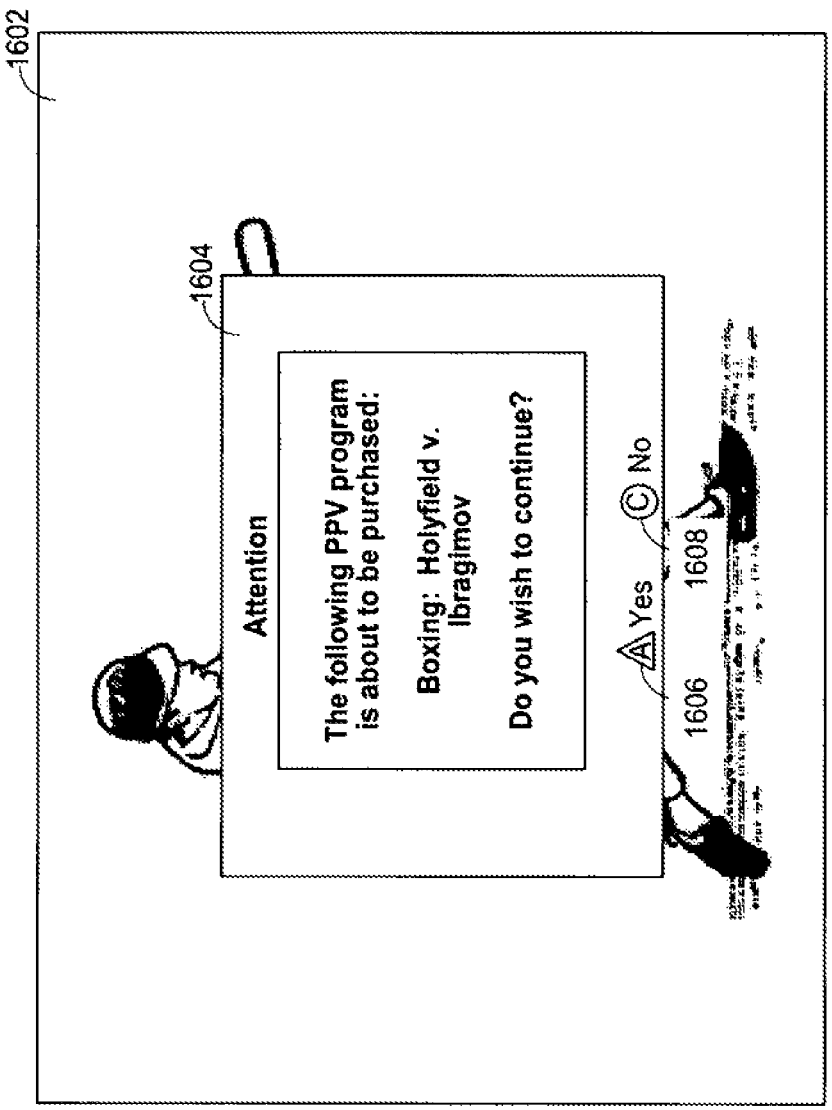
FIG. 16 shows an illustrative display provided to prompt the user to confirm purchase of popular pay programs in accordance with one embodiment of the invention.

FIG. 16 shows an illustrative interactive prompt that may be used to notify the user that a pay program is about to be automatically purchased. The prompt is displayed on display 312 (FIG. 3) of user equipment device or media device 402, 404 or 406 (FIG. 4). In particular, FIG. 16 shows an illustrative interactive media guidance application prompt 1600 that is displayed after the guidance application determines that a pay program meets defined criteria and is ready to record and purchase the pay program. The prompt is only displayed if the "Notification/Verification" sub-option of "Record and Purchase Popular Pay Programs" is selected and turned on in FIG. 12. Television monitor 1602 shows a user watching a baseball game, however the user may be viewing any suitable program. Dialogue prompt 1604 pops on the screen when a pay program is about to be recorded and purchased. In this example, the dialogue prompt 1604 calls attention that the "Boxing: Holyfield v. Ibraqimov" boxing match met the defined criteria and is ready for recording and purchasing. Dialogue prompt 1604 request the user to confirm the purchase of said pay program. A user may accept this selection by pressing a yes button (indicated by 1608) on user input interface 310 (FIG. 3). The guidance application proceeds to purchase said pay program via communication path 412 (FIG. 4) and communication network 414 (FIG. 4), requests authorization to charge user's account, receives authorization, streams data, and downloads the data to user equipment 404 (FIG. 4) or retains the pay program remotely on remote storage 506. A user who does not like this selection may deselect pay program by pressing a no button (indicated by 1608) on user input interface 310 (FIG. 3). The pay program will not be purchased.

Figure 17:
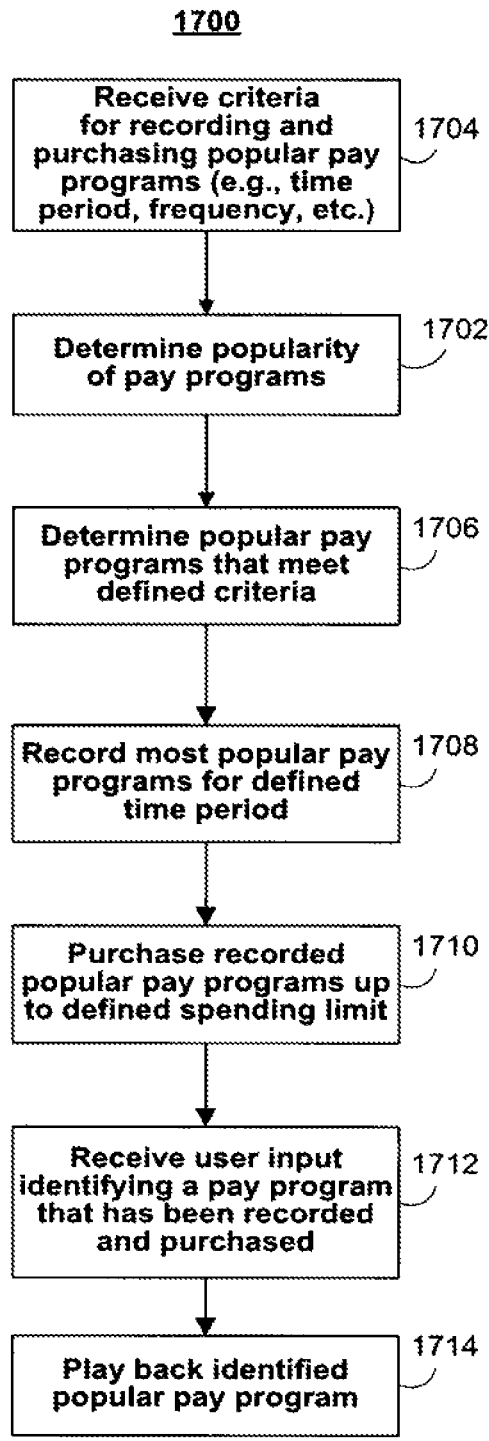

FIGS. 17-21 are illustrative process flow charts of steps involved in determining, recording and purchasing popular pay programs. In particular, FIG. 17 shows an illustrative process 1700 for automatically recording and purchasing popular pay programs, up to a defined spending limit, in accordance with one embodiment of the current invention. Process 1700 may take place in an environment shown in FIG. 5. In step 1702 user equipment device 304 (FIG. 3) or remote server 502 (FIG. 5) receive criteria for recording and purchasing popular pay programs from user input device 310. In the embodiment in which the user equipment device 304 (FIG. 3) receives the criteria, user equipment device 304 (FIG. 3) transmits the criteria to remote server 502 (FIG. 5) via communications network 508 (FIG. 5). In the embodiment in which the remote server 502 (FIG. 5) receives the criteria this step is not needed. Remote server 502 (FIG. 5) receives the input and processing circuitry 504 (FIG. 5) interprets the input. In step 1704 processing circuitry 504 (FIG. 5) transmits requests for information indicative of media selections to users 2 to N's equipment (520 to 540) via communications network 508, and receives this information from users 2 to N's equipment via 508 (FIG. 5). The information gathered may include, for example, the media users 2 to N are currently watching or using, the media users 2 to N are currently recording, the media users 2 to N have scheduled to record, or combinations thereof. Remote server 502 (FIG. 5) using processing circuitry 504 (FIG. 5) processes this popularity information before transmitting it to user equipment device 304 (FIG. 3) via communications network 508 (FIG. 5). User equipment device 304 (FIG. 3) receives the popularity information and stores it in storage 308 (FIG. 3). (Alternatively, remote server 502 (FIG. 5) stores the popularity information in storage 506 (FIG. 5) and transmits the popularity information to user equipment device 304 (FIG. 3) when requested to do so). In step 1706, control circuitry 306 (e.g., under the control of the instructions of an interactive media guidance application), using the popularity information, determines the most popular pay program by, for example, counting the number of users for each pay program that meet the defined criteria and selecting the pay program with the most users for recording. In some embodiments remote server 502 (FIG. 5) may transmit the popularity information to user equipment device 304 (FIG. 3) via communications network 508 (FIG. 5), user equipment device 304 (FIG. 3) stores the information in storage 308 (FIG. 3) and user equipment device 304 (FIG. 3) processes the popularity information. Using this processed popularity information, control circuitry 306 (e.g., under the control of the instructions of an interactive media guidance application) determines the most popular pay program by, for example, counting the number of users for each pay program that meet the defined criteria and selecting the pay program with the most users for recording. In step 1708, user equipment device 304 (FIG. 3) or remote server 504 (FIG. 5) commences recording the selected most popular pay program in either storage 308 (FIG. 3) or storage 506 (FIG. 5). In step 1710, user equipment device 304 (FIG. 3) or remote server 504 (FIG. 5) purchases the most popular pay program by control circuitry 304 (FIG. 3) or processing circuitry 504 (FIG. 5) using well-known technology for purchasing pay programs such as pay-per-view and video-on-demand pay programs, up to the defined spending limit. In step 1712, user equipment device 304 (FIG. 3) or remote server 502 (FIG. 5) receive input from input device 310 (FIG. 3) identifying a pay program that has been recorded on storage 308 (FIG. 3) or storage 506 (FIG. 5). In step 1714, user equipment device 304 (FIG. 3) or remote server 502 (FIG. 5) takes the program from storage 308 (FIG. 3) or storage 506 (FIG. 5) and plays the program on display 312 (FIG. 3).

Figure 18:
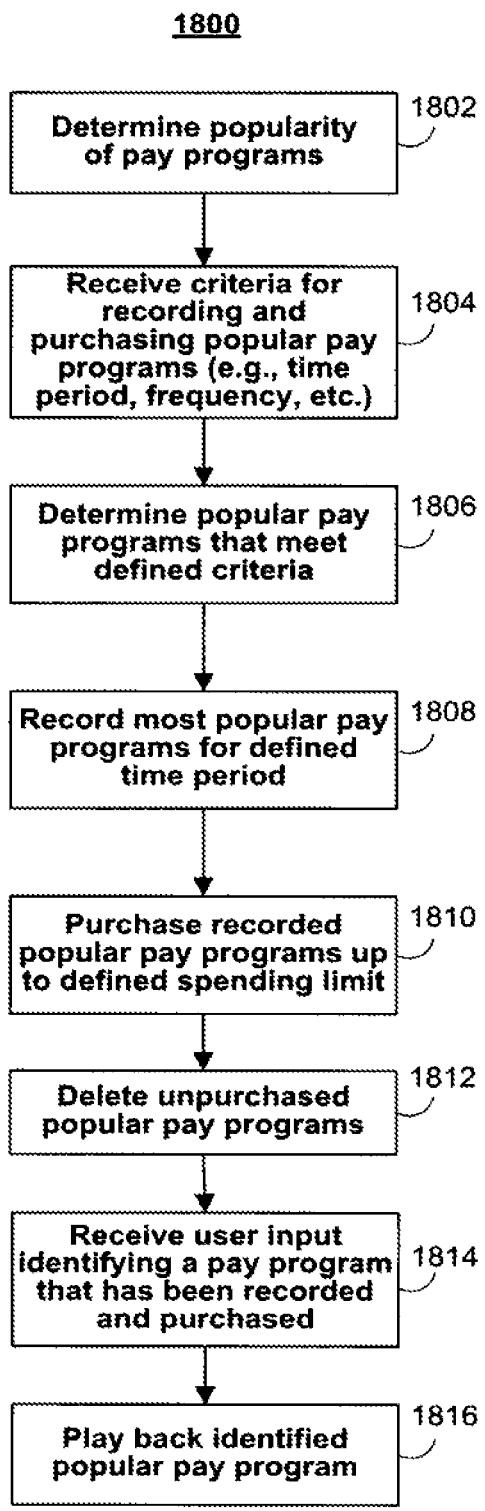

FIG. 18 shows an illustrative process 1800 for automatically recording and purchasing popular pay programs, up to a defined spending limit, in accordance with one embodiment of the current invention. In step 1802 user equipment device 304 (FIG. 3) or remote server 502 (FIG. 5) receive criteria for recording and purchasing popular pay programs from user input device 310. In the embodiment in which the user equipment device 304 (FIG. 3) receives the criteria, user equipment device 304 (FIG. 3) transmits the criteria to remote server 502 (FIG. 5) via communications network 508 (FIG. 5). In the embodiment in which the remote server 502 (FIG. 5) receives the criteria this step is not needed. Remote server 502 (FIG. 5) receives the input and processing circuitry 504 (FIG. 5) interprets the input. In step 1804 processing circuitry 504 (FIG. 5) transmits requests for information indicative of media selections to users 2 to N's equipment (520 to 540) via communications network 508, and receives this information from users 2 to N's equipment via 508 (FIG. 5). The information gathered may include, for example, the media users 2 to N are currently watching or using, the media users 2 to N are currently recording, the media users 2 to N have scheduled to record, or combinations thereof. Remote server 502 (FIG. 5) using processing circuitry 504 (FIG. 5) processes the popularity information before transmitting it to user equipment device 304 (FIG. 3) via communications network 508 (FIG. 5). User equipment device 304 (FIG. 3) receives the popularity information and stores it in storage 308 (FIG. 3). (Alternatively, remote server 502 (FIG. 5) stores the popularity information in storage 506 (FIG. 5) and transmits the popularity information to user equipment device 304 (FIG. 3) when requested to so). In step 1806, control circuitry 306 (e.g., under the control of the instructions of an interactive media guidance application), using the popularity information, determines the most popular pay program by, for example, counting the number of users for each pay program that meet the defined criteria and selecting the pay program with the most users for recording. In some embodiments remote server 502 (FIG. 5) may transmit the popularity information to user equipment device 304 (FIG. 3) via communications network 508 (FIG. 5), user equipment device 304 (FIG. 3) stores the information in storage 308 (FIG. 3) and user equipment device 304 (FIG. 3) processes the popularity information. Using this processed popularity information, control circuitry 306 (e.g., under the control of the instructions of an interactive media guidance application) determines the most popular pay program by, for example, counting the number of users for each pay program that meet the defined criteria and selecting the pay program with the most users for recording. In step 1808, user equipment device 304 (FIG. 3) or remote server 504 (FIG. 5) commences recording the selected most popular pay program in either storage 308 (FIG. 3) or storage 506 (FIG. 5). In step 1810, user equipment device 304 (FIG. 3) or remote server 504 (FIG. 5) purchases the most popular pay program by control circuitry 304 (FIG. 3) or processing circuitry 504 (FIG. 5) using well-known technology for purchasing pay programs such as pay-per-view and video-on-demand pay programs, up to the defined spending limit. It should be noted, that recording and purchasing do not need to take place in two steps as shown in illustrative process 1800. In one embodiment, purchasing is a necessary component of recording, and recording will not take place unless purchasing occurs. For example, in such an embodiment, control circuitry 306 or processing circuitry 504 (e.g., under the control of the instructions of an interactive media guidance application) would record the popular pay program only after purchasing occurs. In step 1812, user equipment device 304 (FIG. 3) deletes un-purchased popular pay programs from storage 308 (FIG. 3) or storage 506 (FIG. 5). In step 1814, user equipment device 304 (FIG. 3) or remote server 502 (FIG. 5) receive input from input device 310 (FIG. 3) identifying a pay program that has been recorded on storage 308 (FIG. 3) or storage 506 (FIG. 5) an not deleted in step 1814. In step 1816, user equipment device 304 (FIG. 3) or remote server 502 (FIG. 5) takes the program from storage 308 (FIG. 3) or storage 506 (FIG. 5) and plays the program on display 312 (FIG. 3).

Figure 19:
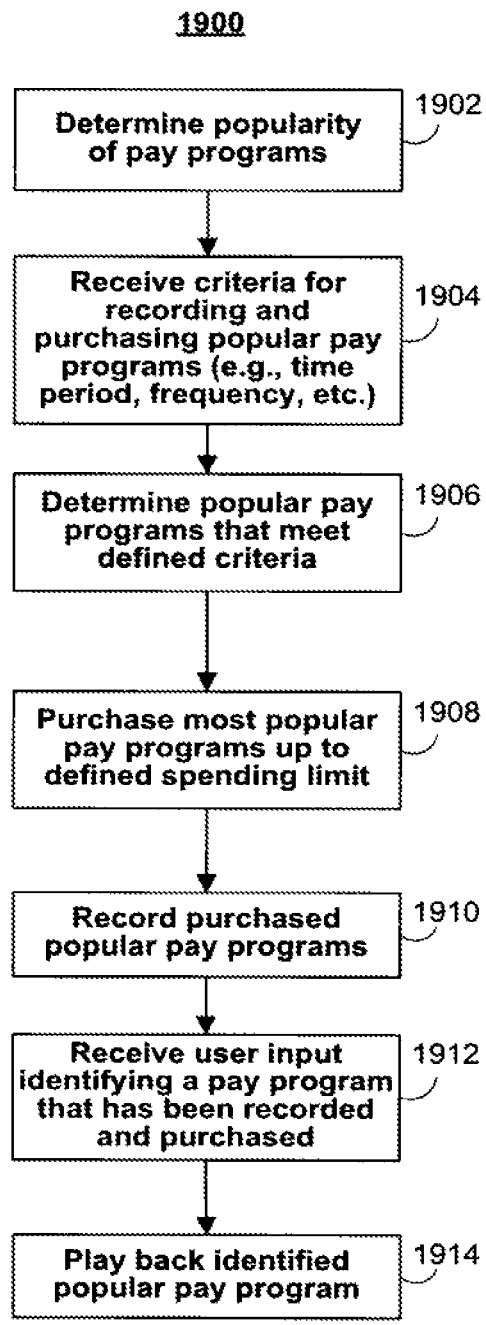

FIG. 19 shows an illustrative process 1900 for automatically recording and purchasing popular pay programs, up to a defined spending limit, in accordance with one embodiment of the current invention. In step 1902 user equipment device 304 (FIG. 3) or remote server 502 (FIG. 5) receive criteria for recording and purchasing popular pay programs from user input device 310. In the embodiment in which the user equipment device 304 (FIG. 3) receives the criteria, user equipment device 304 (FIG. 3) transmits the criteria to remote server 502 (FIG. 5) via communications network 508 (FIG. 5). In the embodiment in which the remote server 502 (FIG. 5) receives the criteria this step is not needed. Remote server 502 (FIG. 5) receives the input and processing circuitry 504 (FIG. 5) interprets the input. In step 1904 processing circuitry 504 (FIG. 5) transmits requests for information indicative of media selections to users 2 to N's equipment (520 to 540) via communications network 508, and receives this information from users 2 to N's equipment via 508 (FIG. 5). The information gathered may include, for example, the media users 2 to N are currently watching or using, the media users 2 to N are currently recording, the media users 2 to N have scheduled to record, or combinations thereof. Remote server 502 (FIG. 5) using processing circuitry 504 (FIG. 5) processes the popularity information before transmitting it to user equipment device 304 (FIG. 3) via communications network 508 (FIG. 5). User equipment device 304 (FIG. 3) receives the popularity information and stores it in storage 308 (FIG. 3). (Alternatively, remote server 502 (FIG. 5) stores the popularity information in storage 506 (FIG. 5) and transmits the popularity information to user equipment device 304 (FIG. 3) when requested to so). In step 1906, control circuitry 306 (e.g., under the control of the instructions of an interactive media guidance application), using the popularity information, determines the most popular pay program by, for example, counting the number of users for each pay program that meet the defined criteria and selecting the pay program with the most users for recording. In some embodiments remote server 502 (FIG. 5) may transmit the popularity information to user equipment device 304 (FIG. 3) via communications network 508 (FIG. 5), user equipment device 304 (FIG. 3) stores the information in storage 308 (FIG. 3) and user equipment device 304 (FIG. 3) processes the popularity information. Using this processed popularity information, control circuitry 306 (e.g., under the control of the instructions of an interactive media guidance application) determines the most popular pay program by, for example, counting the number of users for each pay program that meet the defined criteria and selecting the pay program with the most users for recording. In step 1908, user equipment device 304 (FIG. 3) or remote server 504 (FIG. 5) purchases the most popular pay program by control circuitry 304 (FIG. 3) or processing circuitry 504 (FIG. 5) using well-known technology for purchasing pay programs such as pay-per-view and video-on-demand pay programs, up to the defined spending limit. In step 1910, user equipment device 304 (FIG. 3) or remote server 504 (FIG. 5) commences recording the selected most popular pay program in either storage 308 (FIG. 3) or storage 506 (FIG. 5). In step 1912, user equipment device 304 (FIG. 3) or remote server 502 (FIG. 5) receive input from input device 310 (FIG. 3) identifying a pay program that has been recorded on storage 308 (FIG. 3) or storage 506 (FIG. 5). In step 1914, user equipment device 304 (FIG. 3) or remote server 502 (FIG. 5) takes the program from storage 308 (FIG. 3) or storage 506 (FIG. 5) and plays the program on display 312 (FIG. 3).

Figure 20:
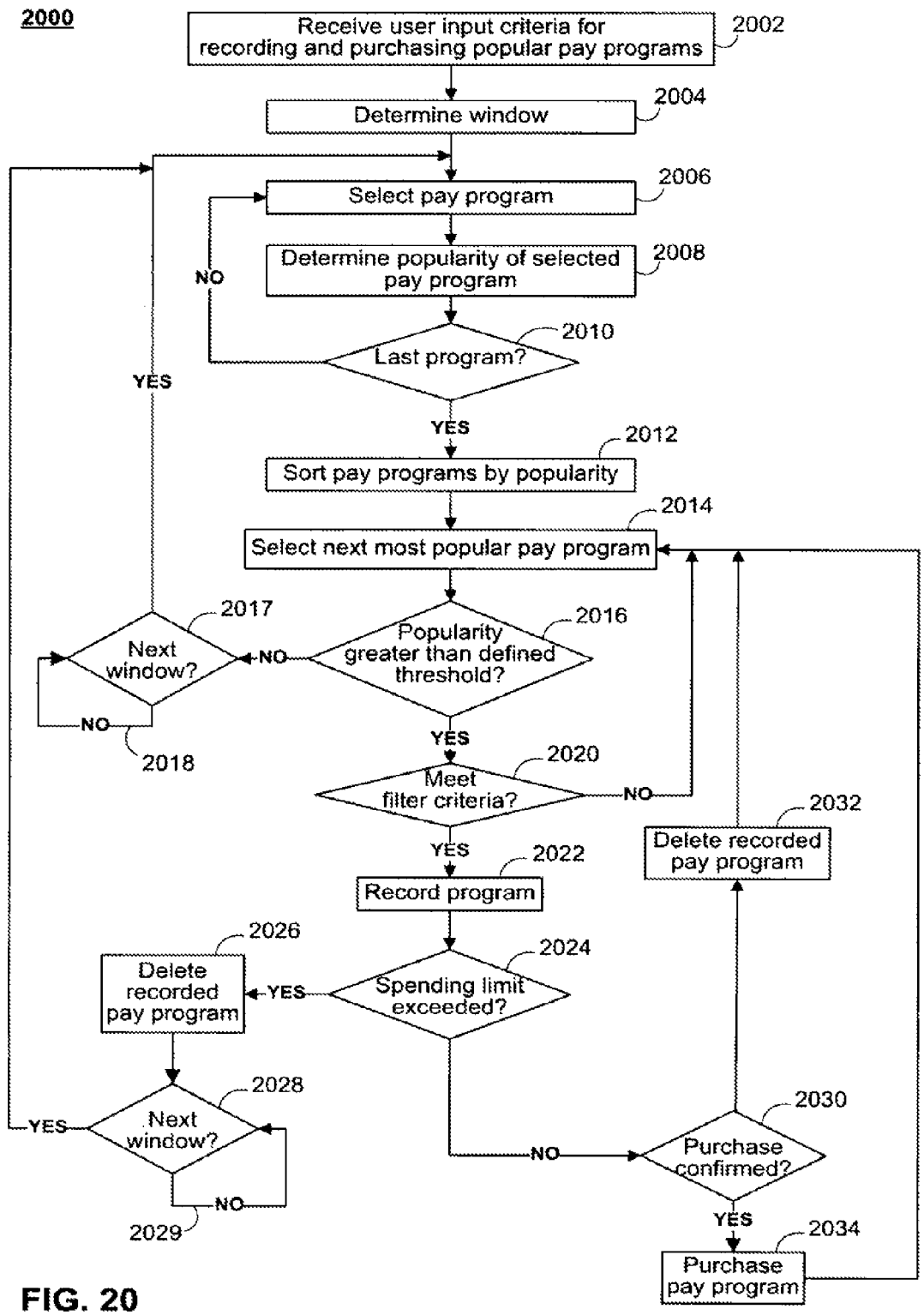

FIG. 20 shows an illustrative process 2000 for automatically recording and purchasing popular pay programs, up to a defined spending limit, in accordance with one embodiment of the current invention. In step 2002, remote server 502 (FIG. 5) receives from user equipment 510 (FIG. 5) via communications network 508 (FIG. 5), user input criteria for recording and purchasing popular pay programs, entered in illustrative displays 600 through 1400 (FIGS. 6 through 14). In step 2004, remote processing circuitry 504 (FIG. 5) (e.g., under the control of the instructions of a guidance application server application) determines the window in which to record and purchases popular pay programs. Remote processing circuitry 504 (FIG. 5) (e.g., under the control of the instructions of a guidance application server application) determines the frequency by, for example, dividing user, input for time period, entered in illustrative displays 800 (FIG. 8), by the user input for frequency, entered in illustrative displays 1000 (FIG. 10). For example, the guidance application may determine 28 days as the time period in which to ascertain the popularity of and record and purchase popular pay programs. The guidance application may also determine 4 as the frequency at which to determine the popularity of pay programs. The guidance application divides the time period, 28, by the frequency, 4, to obtain the window in which to determine popularity, record, and purchase pay programs In this example, the window is every 7 days up to the defined time period. In step 2006, remote server processing circuitry 504 (FIG. 5) (e.g., under the control of the instructions of a guidance application server application) selects a pay program.

In step 2008, remote server processing circuitry 504 (FIG. 5) (e.g., under the control of the instructions of a guidance application server application) determines the popularity of selected pay program. Remote server processing circuitry 504 (FIG. 5) (e.g., under the control of the instructions of a guidance application server application) determines popularity of a pay program by transmitting requests for information indicative of media selections to users 2 to N's equipment (520 to 540) via communications network 508, and receives this information from users 2 to N's equipment via 508 (FIG. 5). The information gathered may include, for example, the media users 2 to N are currently watching or using, the media users 2 to N are currently recording, the media users 2 to N have scheduled to record, or combinations thereof. Remote server 502 (FIG. 5), using processing circuitry 504 (FIG. 5), processes the popularity information. Remote server processing circuitry 504 (FIG. 5) (e.g., under the control of the instructions of a guidance application server application) determines the pay program that, for example, is viewed the most times over the time period, is the most popular. In step 2010, the remote server processing circuitry 504 (FIG. 5) (e.g., under the control of the instructions of a guidance application server application) determines if the pay program selected is the last pay program available. If the selected pay program is not the last program available, the remote server processing circuitry 504 (FIG. 5) (e.g., under the control of the instructions of a guidance application server application) selects the next pay program (step 2006) and determines its popularity similar to the way it determined the previous pay program (step 2008), except that the available pay programs will not include the previously selected program when determining the popularity of the currently selected program. This loop continue until all the pay programs have been evaluated for popularity.

In step 2012, remote server processing circuitry 504 (FIG. 5) (e.g., under the control of the instructions of a guidance application server application) sorts the pay programs by popularity. In step 2014, remote server processing circuitry 504 (FIG. 5) (e.g., under the control of the instructions of a guidance application server application) selects the next most popular pay program. In step 2016, remote server processing circuitry 504 (FIG. 5) (e.g., under the control of the instructions of a guidance application server application) determines if the popularity of the selected pay program is greater than the defined threshold obtained in step 2002 from user equipment 510 (FIG. 5) (although not illustrated in any displays, popularity thresholds may be created by the guidance application or the user. For simplicity, and since it is out of the scope of this invention, illustrative threshold displays are omitted). If the popularity is not greater than the defined threshold, remote server processing circuitry 504 (FIG. 5) (e.g., under the control of the instructions of a guidance application server application) determines if the next window has arrived in which to determine popularity, record and purchase pay programs (step 2017). If the next window did not arrive yet, for example, we are in day three of the first window within the time period, the remote server processing circuitry 504 (FIG. 5) (e.g., under the control of the instructions of a guidance application server application) continues to determine if the window arrived as shown in step 2018. If the next window does arrive, the remote server processing circuitry 504 (FIG. 5) (e.g., under the control of the instructions of a guidance application server application) selects the next pay program (step 2006) and starts the process again.

If the popularity is greater than the defined threshold, in step 2020, the remote server processing circuitry 504 (FIG. 5) (e.g., under the control of the instructions of a guidance application server application) determines if the popular pay program meets filter criteria, entered by the user in illustrative display 1100 and 1300 (FIGS. 11 and 13) and obtained in step 2002 from user equipment 510 (FIG. 5). If the popular pay program does not meet the filter criteria, the remote server processing circuitry 504 (FIG. 5) (e.g., under the control of the instructions of a guidance application server application) selects the next most popular pay program (step 2014). For example, if the user defined the filter in illustrative display 1100 (FIG. 11) so that only pay programs of the comedy genre should be recorded and purchased, any program selected to be most popular but is not a comedy, will be discarded and a different popular pay program will be selected.

If the remote server processing circuitry 504 (FIG. 5) (e.g., under the control of the instructions of a guidance application server application) determines that the popular pay program does meet the defined threshold, in step 2022, the remote server processing circuitry 504 (FIG. 5) (e.g., under the control of the instructions of a guidance application server application) records the popular pay program to user equipment 510 (FIG. 5).

In step 2024, the remote server processing circuitry 504 (FIG. 5) (e.g., under the control of the instructions of a guidance application server application) determines if the spending limit for purchasing popular pay programs, entered by the user in illustrative display 1400 (FIG. 14) and obtained in step 2002 from user equipment 510 (FIG. 5), is exceeded. If the popular pay program exceeds the defined spending limit, the remote server processing circuitry 504 (FIG. 5) (e.g., under the control of the instructions of a guidance application server application) deletes the recorded popular pay program (step 2026) from storage 308 (FIG. 3) or storage 506 (FIG. 5). The remote server processing circuitry 504 (FIG. 5) (e.g., under the control of the instructions of a guidance application server application) determines if the next window has arrived in which to determine popularity, record and purchase pay programs (step 2028). If the next window did not arrive yet, for example, we are in day three of the first window within the time period, the remote server processing circuitry 504 (FIG. 5) (e.g., under the control of the instructions of a guidance application server application) continues to determine if the window arrived as shown in step 2029. If the next window does arrive, the remote server processing circuitry 504 (FIG. 5) (e.g., under the control of the instructions of a guidance application server application) selects the next pay program (step 2006) and starts the process again. For example, the user defined the spending limit to purchase popular pay programs to be $100, and the guidance application already purchases $95 worth of pay programs. If the recorded pay program is more than $5, the guidance application will delete the recorded pay program and wait until the next window to record and purchase additional pay programs.

If the remote server processing circuitry 504 (FIG. 5) (e.g., under the control of the instructions of a guidance application server application) determines that the spending limit is not exceeded, in step 2030, the remote server processing circuitry 504 (FIG. 5) (e.g., under the control of the instructions of a guidance application server application) determines if the purchase is confirmed. The remote server processing circuitry 504 (FIG. 5) (e.g., under the control of the instructions of a guidance application server application) requests confirmation information, entered by the user in illustrative display 1600 (FIG. 16) from user equipment 510 (FIG. 5). In step 2032, if the remote server processing circuitry 504 (FIG. 5) (e.g., under the control of the instructions of a guidance application server application) determines the user did not confirmed the purchase, the remote server processing circuitry 504 (FIG. 5) (e.g., under the control of the instructions of a guidance application server application) deletes the pay program (step 3033) from storage 306 (FIG. 3) or storage 506 (FIG. 5) and selects the next most popular pay program (step 2014).

If the remote server processing circuitry 504 (FIG. 5) (e.g., under the control of the instructions of a guidance application server application) determines the popular pay program is confirmed, in step 2034, the remote server processing circuitry 504 (FIG. 5) (e.g., under the control of the instructions of a guidance application server application) purchases most popular pay program. The remote server processing circuitry 504 (FIG. 5) (e.g., under the control of the instructions of a guidance application server application) then selects the next most popular pay program (step 2014). It should be noted, in one embodiment of the current invention, the purchasing is a necessary component of recording and recording step can trigger the purchasing step. In such an embodiment, purchasing and recording are actually one step and are contingent on each other.

FIG. 21 shows an illustrative process 2100 for automatically recording and purchasing popular pay programs, up to a defined spending limit, in accordance with one embodiment of the current invention. In step 2102, remote server 502 (FIG. 5) receives from user equipment 510 (FIG. 5) via communications network 508 (FIG. 5), user input criteria for recording and purchasing popular pay programs, entered in illustrative displays 600 through 1400 (FIGS. 6 through 14). In step 2104, remote processing circuitry 504 (FIG. 5) (e.g., under the control of the instructions of a guidance application server application) determines the window in which to record and purchases popular pay programs. Remote processing circuitry 504 (FIG. 5) (e.g., under the control of the instructions of a guidance application server application) determines the frequency by, for example, dividing user input for time period, entered in illustrative displays 800 (FIG. 8), by the user input for frequency, entered in illustrative displays 1000 (FIG. 10). For example, the guidance application may determine 28 days as the time period in which to ascertain the popularity of and record and purchase popular pay programs. The guidance application may also determine 4 as the frequency at which to determine the popularity of pay programs. The guidance application divides the time period, 28, by the frequency, 4, to obtain the window in which to determine popularity, record, and purchase pay programs In this example, the window is every 7 days up to the defined time period. In step 2106, remote server processing circuitry 504 (FIG. 5) (e.g., under the control of the instructions of a guidance application server application) selects a pay program.

In step 2108, remote server processing circuitry 504 (FIG. 5) (e.g., under the control of the instructions of a guidance application server application) determines the popularity of selected pay program. Remote server processing circuitry 504 (FIG. 5) (e.g., under the control of the instructions of a guidance application server application) determines popularity of a pay program by transmitting requests for information indicative of media selections to users 2 to N's equipment (520 to 540) via communications network 508, and receives this information from users 2 to N's equipment via 508 (FIG. 5). The information gathered may include, for example, the media users 2 to N are currently watching or using, the media users 2 to N are currently recording, the media users 2 to N have scheduled to record, or combinations thereof. Remote server 502 (FIG. 5), using processing circuitry 504 (FIG. 5), processes the popularity information. Remote server processing circuitry 504 (FIG. 5) (e.g., under the control of the instructions of a guidance application server application) determines the pay program that, for example, is viewed the most times over the time period, is the most popular. In step 2110, the remote server processing circuitry 504 (FIG. 5) (e.g., under the control of the instructions of a guidance application server application) determines if the pay program selected is the last pay program available. If the selected pay program is not the last program available, the remote server processing circuitry 504 (FIG. 5) (e.g., under the control of the instructions of a guidance application server application) selects the next pay program (step 2106) and determines its popularity similar to the way it determined the previous pay program (step 2108), except that the available pay programs will not include the previously selected program when determining the popularity of the currently selected program. This loop continue until all the pay programs have been evaluated for popularity.

In step 2112, remote server processing circuitry 504 (FIG. 5) (e.g., under the control of the instructions of a guidance application server application) sorts the pay programs by popularity. In step 2114, remote server processing circuitry 504 (FIG. 5) (e.g., under the control of the instructions of a guidance application server application) selects the next most popular pay program.

In step 2116, the remote server processing circuitry 504 (FIG. 5) (e.g., under the control of the instructions of a guidance application server application) determines if the popular pay program meets filter criteria, entered by the user in illustrative display 1100 (FIG. 11) and obtained in step 2102 from user equipment 510 (FIG. 5). If the popular pay program does not meet the filter criteria, the remote server processing circuitry 504 (FIG. 5) (e.g., under the control of the instructions of a guidance application server application) selects the next most popular pay program (step 2114). For example, if the user defined the filter in illustrative display 1100 (FIG. 11) so that only pay programs of the comedy genre should be recorded and purchased, any program selected to be most popular but is a comedy, will be discarded and a different popular pay program will be selected.

If the remote server processing circuitry 504 (FIG. 5) (e.g., under the control of the instructions of a guidance application server application) determines that the popular pay program does meet the defined threshold, in step 2118, determines if the spending limit for purchasing popular pay programs, entered by the user in illustrative display 1400 (FIG. 14) and obtained in step 2002 from user equipment 510 (FIG. 5), is exceeded. If the popular pay program exceeds the defined spending limit, the remote server processing circuitry 504 (FIG. 5) (e.g., under the control of the instructions of a guidance application server application) determines if the next window has arrived in which to determine popularity, record and purchase pay programs (step 2120). If the next window did not arrive yet, for example, we are in day three of the first window within the time period, the remote server processing circuitry 504 (FIG. 5) (e.g., under the control of the instructions of a guidance application server application) continues to determine if the window arrived as shown in step 2121. If the next window does arrive, the remote server processing circuitry 504 (FIG. 5) (e.g., under the control of the instructions of a guidance application server application) selects the next pay program (step 2106) and starts the process again. For example, the user defined the spending limit to purchase popular pay programs to be $100, and the guidance application already spent $95. If the recorded pay program is more than $5, the guidance application will wait until the next window and start the process again.

If the remote server processing circuitry 504 (FIG. 5) (e.g., under the control of the instructions of a guidance application server application) determines that the spending limit is not exceeded, in step 2122, the remote server processing circuitry 504 (FIG. 5) (e.g., under the control of the instructions of a guidance application server application) determines if the purchase is confirmed. The remote server processing circuitry 504 (FIG. 5) (e.g., under the control of the instructions of a guidance application server application) requests confirmation information, entered by the user in illustrative display 1600 (FIG. 16) from user equipment 510 (FIG. 5). If the remote server processing circuitry 504 (FIG. 5) (e.g., under the control of the instructions of a guidance application server application) determines the user did not confirmed the purchase, the remote server processing circuitry 504 (FIG. 5) (e.g., under the control of the instructions of a guidance application server application) selects the next most popular pay program (step 2114).

If the remote server processing circuitry 504 (FIG. 5) (e.g., under the control of the instructions of a guidance application server application) determines the popular pay program is confirmed, in step 2124, the remote server processing circuitry 504 (FIG. 5) (e.g., under the control of the instructions of a guidance application server application) purchases most popular pay program. The remote server processing circuitry 504 (FIG. 5) (e.g., under the control of the instructions of a guidance application server application), in step 2126, records the popular pay program to storage 306 (FIG. 3) or storage 506 (FIG. 5) and selects the next most popular pay program (step 2114).

The above described embodiments of the present invention are presented for purposes of illustration and not of limitation, and the present invention is limited only by the claims which follow.

What is claimed is:

1. A method for automatically purchasing and recording popular pay programs in an interactive media delivery system, comprising:
   selecting a time period;
   identifying, using control circuitry, pay programs matching a user-defined criterion;
   determining, among the identified programs, the most popular pay programs before the pay programs are recorded;
   in response to the determining:
      recording the most-popular pay programs;
      determining whether the most popular pay programs correspond to the selected time period; and
      purchasing, up to a defined spending limit, the most-popular pay programs responsive to determining that the most popular pay programs correspond to the selected time period;
   receiving a user input identifying a pay program that has been recorded and purchased; and
   in response to the input, playing back the identified popular pay program.

2. The method of claim 1 wherein recording the most-popular programs comprises recording only the purchased most-popular pay programs.

3. The method of claim 1 further comprising deleting unpurchased, recorded most-popular pay programs.

4. The method defined in claim 1 wherein the pay programs are pay-per-view programs or video-on-demand programs.

5. The method defined in claim 1 wherein the selected time period is defined by a user of the interactive media delivery system.

6. The method defined in claim 1 wherein the purchasing and the recording are performed at a user-specified time within the selected time period.

7. The method defined in claim 1, wherein the user-defined criterion is a frequency at which to purchase and record the most-popular pay programs within the selected time period.

8. The method defined in claim 1, further comprising receiving a user input defining the criterion.

9. The method defined in claim 1 further comprising providing a notification when a pay program is purchased or about to be purchased.

10. The method defined in claim 1 wherein the purchasing and the recording comprises not purchasing and not recording a pay program in response to a user input indicating that the pay program should not be purchased.

11. The method defined in claim 1 wherein the defined spending limit is a flat rate for a defined number of most-popular pay programs.

12. The method of claim 1, wherein the popularity of the pay programs is determined based on popularity of the pay programs among a plurality of user equipment devices in different geographical locations each associated with a different user.

13. The method of claim 1, wherein the popularity of the pay programs is determined based on popularity information received by the control circuitry from a remote source.

14. The method of claim 1, wherein the recording and purchasing are performed without user input.

15. The method of claim 1, wherein the user-defined criterion is a genre.

16. The method of claim 1, wherein determining the most popular pay programs comprises determining popularity, within the selected time period, of each of the pay programs, wherein the most popular pay programs correspond to a plurality of the pay programs for which the associated popularity exceeds a threshold.

17. A system for allowing users of an interactive media guidance application to automatically purchase and record popular pay programs in an interactive media delivery system, comprising:
control circuitry and an input device, the control circuitry configured to:
select a time period;
identify pay programs matching a user-defined criterion;
determine, among the identified programs, the most popular pay programs before the pay programs are recorded;
in response to determining the popularity of pay programs:
record the most-popular pay programs;
determine whether the most popular pay programs correspond to the selected time period; and
purchase, up to a defined spending limit, the most-popular pay programs responsive to determining that the most popular pay programs correspond to the selected time period;
receive a user input from the input device identifying a pay program that has been recorded and purchased; and
in response to the input, play back the identified popular pay program.

18. The system defined in claim 17 wherein the control circuitry is further configured to record only the purchased most-popular pay programs.

19. The system defined in claim 17 wherein the control circuitry is further configured to delete un-purchased, recorded most-popular pay programs.

20. The system defined in claim 17 wherein the pay programs are pay-per-view programs or video-on-demand programs.

21. The system defined in claim 17 wherein the control circuitry is further configured to allow the selected time period to be defined by a user of the interactive media delivery system.

22. The system defined in claim 17 wherein the control circuitry is configured to purchase and record by purchasing and recording the most-popular pay programs at a user-specified time within the selected time period.

23. The system defined in claim 17, wherein the user-defined criterion is a frequency at which to purchase and record the most-popular pay programs within the time period.

24. The system defined in claim 17, wherein the control circuitry is further configured to receive a user input from the input device defining the criterion.

25. The system defined in claim 17 wherein the control circuitry is further configured to provide a notification when a pay program is purchased or about to be purchased.

26. The system defined in claim 17 wherein the control circuitry is configured to purchase and record by not purchasing and recording a pay program in response to a user input indicating that the pay program should not be purchased.

27. The system defined in claim 17 wherein the defined spending limit is a flat rate for a defined number of most-popular pay programs.

28. The system of claim 17, wherein the user-defined criterion is a genre.

29. The system of claim 17, wherein the control circuitry is further configured to determine popularity, within the selected time period, of each of the pay programs, wherein the most popular pay programs correspond to a plurality of the pay programs for which the associated popularity exceeds a threshold.

30. A method for automatically purchasing popular pay programs in an interactive media system, the method comprising:
selecting a time period;
identifying, using control circuitry, pay programs matching a user-defined criterion;
determining, among the identified programs, the most popular pay programs;
determining whether the most popular pay programs correspond to the selected time period;
purchasing some of the pay programs determined to be the most popular responsive to determining that the most popular pay programs correspond to the selected time period;
receiving an input identifying at least one of the purchased pay programs; and
in response to the input, accessing the identified at least one of the purchased pay programs.

31. A system for automatically purchasing popular pay programs in an interactive media system, the system comprising:
control circuitry configured to:
select a time period;
identify pay programs matching a user-defined criterion;
determine, among the identified programs, the most popular pay programs;
determine whether the most popular pay programs correspond to the selected time period;
purchase some of the pay programs determined to be the most popular responsive to determining that the most popular pay programs correspond to the selected time period;
receive an input identifying at least one of the purchased pay programs; and
in response to the input, access the identified at least one of the purchased pay programs.

* * * * *